(12) United States Patent
Matsubayashi

(10) Patent No.: US 9,494,182 B2
(45) Date of Patent: Nov. 15, 2016

(54) FASTENER AND FASTENING STRUCTURE

(75) Inventor: Kou Matsubayashi, Nagoya (JP)

(73) Assignee: Art Screw Co., Ltd., Nagoya-shi, Aichi (JP)

( * ) Notice: Subject to any disclaimer, the term of this patent is extended or adjusted under 35 U.S.C. 154(b) by 506 days.

(21) Appl. No.: 12/936,677

(22) PCT Filed: Feb. 12, 2010

(86) PCT No.: PCT/JP2010/000858
§ 371 (c)(1),
(2), (4) Date: Oct. 6, 2010

(87) PCT Pub. No.: WO2010/092817
PCT Pub. Date: Aug. 19, 2010

(65) Prior Publication Data
US 2011/0033263 A1 Feb. 10, 2011

(30) Foreign Application Priority Data
Feb. 12, 2009 (JP) .................. 2009-029499

(51) Int. Cl.
*F16B 33/00* (2006.01)
*F16B 39/30* (2006.01)

(52) U.S. Cl.
CPC ................... *F16B 39/30* (2013.01)

(58) Field of Classification Search
CPC .... F16B 33/02; F16B 25/0047; F16B 39/30; F16B 33/00
USPC ....................... 411/414, 308, 366.1, 411, 436
See application file for complete search history.

(56) References Cited

U.S. PATENT DOCUMENTS

| 1,250,748 | A | * | 12/1917 | Woodward | 411/309 |
| 3,323,402 | A | * | 6/1967 | Gowen, Jr. et al. | 411/411 |
| 3,460,598 | A | * | 8/1969 | Thurston | 411/334 |
| 4,071,067 | A | * | 1/1978 | Goldby | 411/307 |
| 4,540,321 | A | * | 9/1985 | Berecz | 411/310 |
| 4,907,926 | A | * | 3/1990 | Wing | 411/366.3 |
| 5,127,784 | A | * | 7/1992 | Eslinger | 411/414 |
| 5,304,023 | A | * | 4/1994 | Toback et al. | 411/387.3 |
| 5,876,168 | A |   | 3/1999 | Iwata | |
| 6,394,726 | B1 | * | 5/2002 | Garvick | 411/414 |

(Continued)

FOREIGN PATENT DOCUMENTS

| CN | 101424295 | 5/2009 |
| DE | 10308130 A1 | 9/2004 |

(Continued)

OTHER PUBLICATIONS

Supplemental European Search Report dated Jun. 19, 2013, for Application No. 10741097.9, Art Screw Co., Ltd. (foreign counterpart).

(Continued)

*Primary Examiner* — Roberta Delisle
(74) *Attorney, Agent, or Firm* — Quarles & Brady LLP; Gavin J. Milczarek-Desai

(57) ABSTRACT

To provide a fastener having a high anti-loosening effect. A fastener has a thread structure including an upper portion of the crest and a bottom portion at the groove. The upper portion has a load flank surface inclined from the standard load flank surface toward the fastener seat while the bottom has an undercut on at least one of the groove side lower than the extension of the corresponding flank surface.

24 Claims, 10 Drawing Sheets

(56) References Cited

U.S. PATENT DOCUMENTS

| | | | |
|---|---|---|---|
| 6,848,724 B2* | 2/2005 | Kessler | 285/334 |
| 6,923,611 B2* | 8/2005 | Kenny | 411/411 |
| 7,416,374 B2* | 8/2008 | Breihan et al. | 411/411 |
| 7,731,466 B2* | 6/2010 | Shea et al. | 411/366.3 |
| 7,753,631 B2* | 7/2010 | Sugimura | 411/366.1 |
| 7,997,842 B2* | 8/2011 | Diekmeyer | 411/366.1 |
| 8,671,547 B2* | 3/2014 | Matsubayashi et al. | 29/525.01 |
| 2011/0033263 A1 | 2/2011 | Matsubayashi | |

FOREIGN PATENT DOCUMENTS

| | | |
|---|---|---|
| JP | 48-13902 | 5/1973 |
| JP | 53-88664 | 7/1978 |
| JP | A-S59-019712 | 2/1984 |
| JP | S-63-164616 | 10/1988 |
| JP | 3-6115 | 1/1991 |
| JP | 8-177839 | 7/1996 |
| JP | 3031085 | 8/1996 |
| JP | A-H09-100825 | 4/1997 |
| JP | 11-51033 | 2/1999 |
| JP | 3095134 | 4/2003 |
| JP | 2005-61602 | 3/2005 |
| JP | 2006-57801 | 3/2006 |
| JP | 2008-144955 | 6/2008 |
| TW | 201033485 | 9/2010 |
| WO | WO8911044 | 5/1989 |
| WO | 2008/081721 A1 | 10/2008 |

OTHER PUBLICATIONS

Search Report dated May 13, 2013, for Taiwan Invention Patent Application No. 100125488 (related application).

* cited by examiner

Fig. 12

| ITEM TO BE TESTED | | RESULT | LOOSENING TORQUE (N·m) |
|---|---|---|---|
| JIS-COMPLIANT ITEM | BOLT (TRIVALENT CHROMATE PLATED) 4.8T + NUT (TRIVALENT CHROMATE PLATED) | LOOSENED IN 16 SECONDS | |
| | BOLT (TRIVALENT CHROMATE PLATED) 8.8T + NUT (S45C TRIVALENT CHROMATE PLATED) | LOOSENED IN 25 SECONDS | |
| FOURTH EXAMPLE (FIG. 6) | BOLT (TRIVALENT CHROMATE PLATED) 4.8T + NUT (TRIVALENT CHROMATE PLATED) | LOOSENED IN 2 MINUTES AND 9 SECONDS | |
| | BOLT (TRIVALENT CHROMATE PLATED) 8.8T + NUT (S45C TRIVALENT CHROMATE PLATED) | LOOSENED IN 9 MINUTES AND 58 SECONDS | |
| EIGHTH EXAMPLE (FIG. 10A and 10B) | BOLT (TRIVALENT CHROMATE PLATED) 4.8T + NUT (TRIVALENT CHROMATE PLATED) | LOOSENED IN 4 MINUTES AND 4 SECONDS | |
| | BOLT (TRIVALENT CHROMATE PLATED) 8.8T + NUT (S45C TRIVALENT CHROMATE PLATED) | NOT LOOSENED IN 10 MINUTES | 66.0 |

FASTENER AND FASTENING STRUCTURE

TECHNICAL FIELD

The present invention relates to a fastening member having a thread structure and a fastening structure.

BACKGROUND ART

Fastening members having a thread structure such as bolts and nuts are widely used in the related art. In order to enable a bolt to be actually tightened into a nut, it is necessary to provide a dimensional tolerance between the outside diameter and the effective diameter of the bolt and the inside diameter and the effective diameter of the nut. Meanwhile, such a tolerance may loosen the bolt and the nut. Various contrivances have been made in the related art to prevent occurrence of such loosening.

Japanese Utility Model Application Publication No. JP-U-Sho 53-88664 and Japanese Patent Application Publication No. JP-A-Hei 8-177839 disclose a male thread structure partially including a screw thread provided with a pressure flank surface, the flank angle of which is smaller than the flank angle of a basic profile, and a clearance flank surface, the flank angle of which is larger than the flank angle of the basic profile.

Japanese Patent Application Publication No. JP-A-Hei 11-51033 discloses a fastening member including a slit formed in the crest of a screw thread and extending in a direction that is perpendicular to the axis of the thread, and a widely formed root.

A method of preventing loosening by forming a resin coating layer on part of a screw thread is also proposed.

Japanese Patent Application Publication No. JP-A-2006-57801 discloses a firmly tightening screw as a related art of the present invention.

DISCLOSURE OF THE INVENTION

Problem to be Solved by the Invention

When the fastening member according to Japanese Utility Model Application Publication No. JP-U-Sho 53-88664 is engaged with a female thread, the pressure flank surface of the male thread positively presses the flank surface of the female thread. Because no configuration is provided that promotes elastic deformation of the screw thread of the male thread, however, no large friction force is obtained between the screw thread of the male thread and the screw thread of the female thread, which yields no significant loosening prevention effect.

In the configuration according to Japanese Patent Application Publication No. JP-A-Hei 8-177839, the angle of the screw thread of the male thread is set to 50°, for example, to provide a gap between the flank surface of the male thread and the flank surface of the female thread, which permits elastic deformation. However, such a gap does not allow sufficient elastic deformation, which leaves room for improvement.

In the configuration according to Japanese Patent Application Publication No. JP-A-Hei 11-51033, the flanks are elastically deformed to be sprung back in the thread crest provided with the slit when fastened. Because the flanks are sprung back only for the size (depth) of the slit, however, no large friction force is obtained, which demonstrates no sufficient loosening prevention effect.

In the method of preventing loosening by forming a resin coating layer on part of a screw thread, it is necessary to repeatedly form a resin coating layer each time the screw is reused, which is troublesome. In a method of preventing loosening through a friction force generated by contacting a male thread and a female thread, a friction torque (prevailing torque) is generated, which complicates torque management. In addition, this requires tightening with a considerable force, which results in poor workability.

In a configuration according to the related art, a minute slide (so-called "initial loosening") occurs due to wear or deformation of a seat surface. If such initial loosening is left unaddressed, an object to be fastened may slide, which may cause excessive stress concentration on a bolt and hence a breakage of the bolt. The initial loosening is difficult to prevent from occurring, and the only way to address the initial loosening is additional tightening.

In the case where a male thread and a female thread are to be hot-dip galvanized, it is necessary to cut a larger portion of the female thread than normally (that is, "overtap" the female thread) in order to prevent the male thread and the female thread from becoming unable to fit each other due to the thickness of the plating.

Normally, an overtap of about 0.40 mm to about 0.80 mm is provided for an M10 thread. When such overtap is applied to the male thread structures according to Japanese Utility Model Application Publication No. JP-U-Sho 53-88664 and Japanese Patent Application Publication No. JP-A-Hei 8-177839, the gap between the flank surface of the male thread and the flank surface of the female thread is increased, as a result of which the friction force between the flank surface of the male thread and the flank surface of the female thread may be significantly reduced or may not be obtained at all. Therefore, it is very difficult to apply thick plating such as hot-dip galvanizing to the male thread structures according to Japanese Utility Model Application Publication No. JP-U-Sho 53-88664 and Japanese Patent Application Publication No. JP-A-Hei 8-177839 while maintaining the loosening prevention effect.

The present invention has been made to solve the foregoing problems, and therefore has at least one of the following objects.

(1) To provide a fastening member or a fastening structure that yields a significant loosening prevention effect.

(2) To provide a fastening member or a fastening structure that can be tightened in the same way as a normal bolt to facilitate torque management, and that can be reused easily.

(3) To provide a fastening member or a fastening structure with improved fatigue strength achieved by equalizing the load imposed on all screw threads of the fastening member to prevent stress concentration.

(4) To provide a fastening member or a fastening structure that prevents occurrence of initial loosening.

(5) To provide a fastening member or a fastening structure to which thick plating can be applied while maintaining the loosening prevention effect.

Means for Solving the Problem

In order to achieve at least one of the above objects, the present invention provides a fastening member as follows.

That is, the present invention provides a fastening member having a thread structure, including an upper portion provided on a side of a thread crest, and a lower portion provided on a side of a thread root, in which a pressure flank surface formed in the upper portion is provided on a side of a seat surface with respect to a pressure flank surface of a basic profile, and at least one side surface of the lower portion is provided inwardly of an extension line of a corresponding flank surface.

Effects of the Invention

In the fastening member according to the present invention, the pressure flank surface formed in the upper portion provided on the side of the thread crest is provided on the side of the seat surface with respect to the pressure flank surface of the basic profile. Therefore, when the fastening member is fastened to a mating fastening member, the pressure flank surface is pressed by the mating fastening member.

A side surface of the lower portion of the screw thread of the fastening member is located inwardly of the corresponding flank surface, and shaped to be dented inward. Thus, the lower portion of the screw thread is elastically deformed by the above pressing, which generates a reaction force (springback) against the pressure flank surface of the mating fastening member in the entire screw thread.

Accordingly, the friction force between the pressure flank surface of the fastening member and the pressure flank surface of the mating fastening member is increased, which demonstrates a significant loosening prevention effect.

The pressure flank surface of the fastening member is pressed by the mating fastening member, which elastically deforms the lower portion of the screw thread. Therefore, the entire screw thread rises up along the mating fastening member.

Accordingly, the pressure flank surface of the fastening member and the pressure flank surface of the mating fastening member necessarily contact each other even if overtap is provided. Therefore, a reaction force (spring-back) against the mating fastening member is generated in the screw thread irrespective of the size of the gap between the fastening member and the mating fastening member, which demonstrates a loosening prevention effect.

Thus, the loosening prevention effect is not reduced even if overtap is provided in the mating fastening member for the fastening member according to the present invention, and therefore thick plating can be performed on the fastening member according to the present invention while maintaining the loosening prevention effect.

Further, in the fastening member according to the present invention, the friction force on the seat surface of the fastening member is also increased by the reaction force (spring-back) of the screw thread.

This prevents initial loosening due to wear or deformation of the seat surface, and in turn prevents a breakage of the fastening member due to the initial loosening, which improves the reliability. The absence of initial loosening eliminates the need for additional tightening, which improves the workability.

When the fastening member according to the present invention is brought back from the fastened state to the unfastened state, the entire screw thread is brought back to the state before fastening (a state in which the pressure flank surface is positioned on the side of the seat surface with respect to the pressure flank surface of the basic profile).

This allows repeated use of the fastening member according to the present invention without the need for a special treatment.

When the fastening member according to the present invention is fastened, the lower portion of the screw thread is elastically deformed. Therefore, the mating fastening member is unlikely to be damaged, and the loosening prevention effect is not reduced even after repeated use.

BRIEF DESCRIPTION OF THE DRAWINGS

FIG. 12 is a table showing the results of a vibration test in which the period from tightening to loosening was measured for a bolt from items to be tested (items according to the JIS standards, Example 4, and Example 8).

BEST MODES FOR CARRYING OUT THE INVENTION

Figure 1:
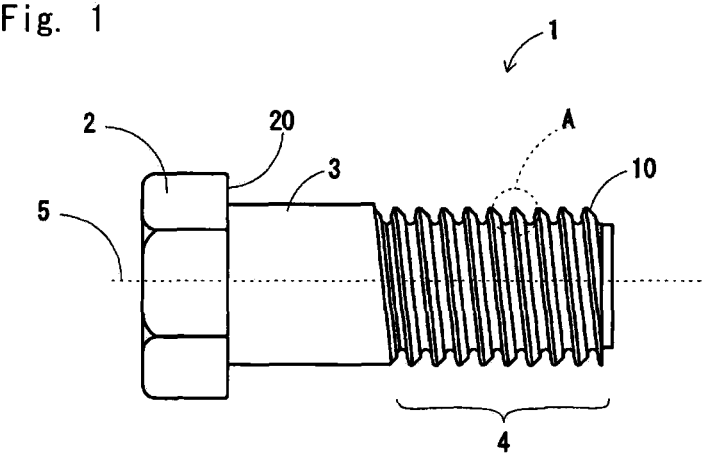
FIG. 1 is a front view of a bolt 1 including a screw thread 10 according to Example 1 of the present invention in an unfastened state.

Various aspects of the present invention will be described in detail below.

[First, Sixth, and Seventh Aspects]

A fastening member according to a first aspect has a thread structure, and includes an upper portion provided on a side of a thread crest, and a lower portion provided on a side of a thread root.

The term "thread structure" as used herein refers to a structure in which a screw thread and a thread root are formed spirally on a side surface of a cylindrical main body toward the distal end of the main body.

The term "upper portion" refers to a portion on the side of the thread crest with respect to an imaginary cylinder defining the effective diameter of a basic profile. The term "lower portion" refers to a portion on the side of the thread root with respect to the imaginary cylinder. The term "effective diameter" refers to the diameter of an imaginary cylinder on which the respective widths of the thread groove and the screw thread of the basic profile as measured in the axial direction are equal to each other. The term "imaginary cylinder defining the effective diameter" refers to the imaginary cylinder described above.

The upper portion of the screw thread is provided on the side of the thread crest with respect to the imaginary cylinder defining the effective diameter of the basic profile, and therefore the pressure flank surface is secured sufficiently. Accordingly, the contact area between the pressure flank surface formed in the upper portion and the mating fastening member can be secured.

In a sixth aspect, an angle of a screw thread of the upper portion is generally the same as an angle of a screw thread of the basic profile. According to the sixth aspect, the clearance flank surface does not contact the flank surface of the mating fastening member even if the screw thread is elastically deformed in the fastened state. Thus, a significant loosening prevention effect is demonstrated without requiring a force that is more than necessary when tightening.

The term "basic profile" as used herein refers to a theoretical screw thread shape defined by the JIS standards, for example, and refers to a screw thread shape in which the angle of a screw thread is 60° and both flank angles are 30° with flank surfaces provided symmetrically with respect to a line that is perpendicular to the axis, or a screw thread shape complying with the screw thread shape of the Whitworth screw thread in which the angle of a screw thread is 55° and both flank angles are 27.5° with flank surfaces provided symmetrically with respect to a line that is perpendicular to the axis. Thus, the angle of a screw thread of a male thread is about 60° or about 55°, for example.

In the first aspect, a pressure flank surface is provided on a side of a seat surface with respect to a pressure flank surface of a basic profile.

The shape of the pressure flank surface is normally a flat surface shape, but is not limited thereto, and may be the shape of a round surface that is curved toward the seat surface.

The flank angle of the pressure flank surface is preferably smaller than the flank angle of the basic profile.

Accordingly, when fastening, the fastening member can be screwed easily before the mating fastening member reaches the seat surface of the fastening member, and when tightening starts, the screw thread is gradually elastically deformed to demonstrate a loosening prevention effect due to a spring-back effect.

As the fastening member is further tightened, the contact area between the pressure flank surface and the flank surface of the mating fastening member gradually increases. Therefore, the screw thread is easily elastically deformed, which ensures a spring-back effect and thus makes the fastening member unlikely to be loosened.

The term "flank angle" refers to the angle formed between a line that is perpendicular to the axis and a flank surface.

In the seventh aspect, the angle of the screw thread of the upper portion is 60°, and a flank angle of the pressure flank surface is larger than 0° and smaller than 30°.

According to the seventh aspect, the spring-back effect is easily obtained, which further enhances the loosening prevention effect.

The flank angle of the pressure flank surface is preferably about 18° to about 26°.

The flank angle of the clearance flank surface may be determined in consideration of the flank angle of the pressure flank surface. For example, the flank angle of the clearance flank surface may be made larger than the flank angle of the basic profile, and may be determined to be an angle obtained by subtracting from the angle of the screw thread of the basic profile the flank angle on the side of the seat surface. The flank angle of the clearance flank surface may be larger than 30° and smaller than 60°, preferably about 34° to about 42°.

In the first aspect, at least one side surface of the lower portion is positioned inwardly of an extension line of a corresponding flank surface.

Therefore, the lower portion is formed to be thin compared to a case where the side surface of the lower portion is provided along the extension line of the flank surface. This permits elastic deformation of the lower portion, and allows the entire screw thread to be warped.

[Second Aspect]

In the second aspect, in addition to the configuration of the first aspect, when viewed in cross section including an axis of the fastening member, the at least one side surface of the lower portion has a shape of a curved surface that is curved inward from the extension line of the corresponding flank surface, or a shape in which a flat surface that is disposed inwardly of the extension line of the corresponding flank surface and a curved surface that is curved inward from the extension line are combined.

In the case where the side surface of the lower portion has the shape of a curved surface that is curved inward from the extension line of the corresponding flank surface, the curved surface may have the shape of a round surface having a constant radius of curvature, or the shape of a complex round surface in which a plurality of curved surfaces having different radii of curvature are combined.

In the case where the side surface of the lower portion has a shape in which a flat surface that is disposed inwardly of the extension line of the corresponding flank surface and a curved surface that is curved inward from the extension line are combined, the flat surface may be a surface that is perpendicular to the axial direction of the fastening member, and the curved surface may be the round surface or the complex round surface described above.

Preferably, the lower edge of the side surface of the lower portion having a curved surface shape and the root (which couples side surfaces of adjacent screw threads) are smoothly continuous with each other so that the entire root takes a curved surface shape.

According to the second aspect, the lower portion is sufficiently thin, which allows the lower portion to be elastically deformed and the entire screw thread to be warped in the fastened state. Therefore, a reaction force (spring-back) against the mating fastening member fastened to the fastening member is increased, which increases the friction force to yield a significant loosening prevention effect.

Since the lower portion of the screw thread has a curved surface shape, the lower portion of the screw thread is not easily plastically deformed (or cracked). In general, when a strong fastening force is applied to the fastening member, stresses tend to concentrate on the root of the fastening member or in the vicinity of the root, at which plastic deformation (or a crack) tends to occur.

By providing a curved surface shape in the lower portion of the screw thread as in the second aspect, stresses are dispersed, which makes the screw thread to be elastically deformable to a greater degree while avoiding a yield of the lower portion. As a result, a reaction force (spring-back) of the screw thread also becomes larger. In other words, the lower portion is not easily plastically deformed, which more reliably makes the screw thread elastically deformable.

[Third Aspect]

In the third aspect, in addition to the configuration of the first or second aspect, a lower end of a clearance flank surface is positioned on the side of the thread crest with respect to an imaginary cylinder indicating an effective diameter of the basic profile, and a clearance side surface of the lower portion is provided inwardly of an extension line of the clearance flank surface, and formed to be continuous from the lower end of the clearance flank surface.

The phrase "formed to be continuous from the lower end of the clearance flank surface" means that the clearance side surface of the lower portion is formed directly from the distal end of the upper portion of the screw thread on the clearance side (that is, the lower end of the clearance flank surface), and means that the clearance flank surface and the clearance side surface are formed to contact each other at the lower end of the clearance flank surface.

According to the third aspect, the clearance side surface of the lower portion is dented over a wide range to make the lower portion further thinner, which makes it easy for the screw thread to be elastically deformed to the clearance side. Therefore, the screw thread is warped to the clearance side to further increase the reaction force (spring-back), which yields a significant loosening prevention effect.

[Fourth Aspect]

In the fourth aspect, in addition to the configuration of the first or second aspect, a lower end of the pressure flank surface is positioned on the side of the thread crest with respect to a lower end of a clearance flank surface, a pressure side surface is provided inwardly of an extension line of the pressure flank surface, and formed to be continuous from the lower end of the pressure flank surface, and a clearance side surface of the lower portion is provided inwardly of an extension line of the clearance flank surface, and formed to be continuous from the lower end of the clearance flank surface.

According to the fourth aspect, the pressure side surface of the lower portion is dented over a wide range compared to the clearance side surface, which makes the pressure side surface of the lower portion further thinner and the clearance side surface of the lower portion thicker than the pressure side.

With such a shape, while the screw thread receives a pressure from the side of the seat surface in the fastened state, the screw thread is warped to a reduced degree. As a result, stresses concentrate on the pressure flank surface of the screw thread to cause the material forming the pressure flank surface to be elastically deformed along the pressure flank surface. Thus, a high friction force is generated in the pressure flank surface to yield a significant loosening prevention effect.

[Fifth Aspect]

In the fifth aspect, in addition to the configuration of the fourth aspect, the lower end of the pressure flank surface is positioned on the side of the thread crest with respect to an imaginary cylinder indicating an effective diameter of the basic profile, and the lower end of the clearance flank surface is positioned on the side of the thread root with respect to the imaginary cylinder.

According to the fifth aspect, the functions and effects of the fourth aspect are obtained more reliably.

[Eighth Aspect]

In the eighth aspect, in addition to the configuration of the first or second aspect, an angle of a screw thread of the upper portion is larger than an angle of a screw thread of the basic profile, and a flank angle of the pressure flank surface is generally the same as a flank angle of the pressure flank surface of the screw thread of the basic profile.

In the eighth aspect, when the fastening member is tightened into the mating fastening member, a pressure flank surface of the mating fastening member presses the pressure flank surface of the fastening member. Since the flank angle of the pressure flank surface of the fastening member is generally the same as the flank angle of the pressure flank surface of the screw thread of the basic profile, the pressure flank surface of the fastening member is parallel to the pressure flank surface of the mating fastening member.

Therefore, according to the eighth aspect, generally the entirety of the pressure flank surface of the fastening member is pressed against the pressure flank surface of the mating fastening member to generate a stable strong pressing force, which results in a strong friction force between both the pressure flank surfaces to yield a significant loosening prevention effect.

[Ninth Aspect]

A fastening structure according to the ninth aspect includes a fastening member according to any one of the first to eighth aspects, and a mating fastening member to be fastened to the fastening member, and when the fastening member is fastened to the mating fastening member, a pressure flank surface of the mating fastening member presses the pressure flank surface of the fastening member to elastically deform the lower portion of the fastening member in order to increase a friction force between the pressure flank surface of the fastening member and the pressure flank surface of the mating fastening member.

According to the ninth aspect, the friction force between the pressure flank surface of the fastening member and the pressure flank surface of the mating fastening member is increased, which yields a significant loosening prevention effect.

The type of the mating fastening member is not specifically limited, and any type having a thread structure complying with known standards such as a unified screw thread and a Whitworth screw thread, for example, may be employed.

[Tenth Aspect]

In the tenth aspect, in addition to the configuration of the ninth aspect, when the fastening member is fastened to the mating fastening member, the thread crest of the fastening member contacts a thread root of the mating fastening member.

According to the tenth aspect, the fastening member can be tightened into the mating fastening member with little resistance before a force is applied to the seat surface of the fastening member. As the seat surface is tightened to increase a torque, however, the pressure flank surface of the fastening member is pressed against the pressure flank surface of the mating fastening member to cause the screw thread of the fastening member to rise up to the clearance side. Accordingly, the screw thread of the fastening member is sprung back to the pressure side, which increases the friction force between the pressure flank surface of the fastening member and the pressure flank surface of the mating fastening member.

Further, according to the tenth aspect, with the screw thread of the fastening member rising up to the clearance side, the outside diameter of the thread is increased, which causes the thread crest of the fastening member to contact the thread root of the mating fastening member to be restrained by the thread root. Such a restraining force is added to the friction force between the pressure flank surface of the fastening member and the pressure flank surface of the mating fastening member to prevent radial loosening of the fastening member, which yields a further significant loosening prevention effect as a whole.

In the tenth aspect, in the case where a mating fastening member complying with the JIS standards or the ISO standards is used, the outside diameter of the screw thread of the fastening member is larger than the outside diameter according to the JIS standards or the ISO standards (that is, the outside diameter of the screw thread of the basic profile). Thus, the thread crest of the fastening member is higher than the thread crest of the screw thread of the basic profile. Also, because the pitch of the screw thread of the fastening member is the same as the pitch of the thread root, the angle of the screw thread of the fastening member is smaller than the angle of the screw thread of the basic profile.

The root diameter of the thread root of the mating fastening member may be reduced so that the thread crest of the fastening member contacts the thread root of the mating fastening member when fastened.

[Eleventh Aspect]

In the eleventh aspect, in addition to the configuration of the ninth aspect, when the fastening member is fastened to the mating fastening member, the clearance flank surface of the fastening member contacts a clearance flank surface of the mating fastening member.

According to the eleventh aspect, the fastening member can be tightened into the mating fastening member with little resistance before a force is applied to the seat surface of the fastening member. As the seat surface is tightened to increase a torque, however, the screw thread rises up to cause the clearance flank surface of the fastening member to contact, and be pressed against, the clearance flank surface of the mating fastening member, which generates a strong friction force. Such a friction force is added to the friction force between the pressure flank surfaces, which yields a further significant loosening prevention effect as a whole.

The eleventh aspect can be implemented by providing a swelling portion on the clearance flank surface of the fastening member. Providing a swelling portion can further increase the friction force between the clearance flank surface of the fastening member and the clearance flank surface of the mating fastening member in the fastened state.

The swelling portion is shaped to be parallel to the clearance flank surface of the mating fastening member. Accordingly, interference between the swelling portion and the clearance flank surface of the mating fastening member is avoided, and a strong friction force is obtained with the swelling portion pressed against the clearance flank surface of the mating fastening member.

The swelling portion is formed to swell to a gradually increasing degree from the lower end of the clearance flank surface toward the thread crest. Accordingly, since the seat surface is tightened to cause the screw thread to rise up such that the thread crest side of the clearance flank surface of the screw thread moves toward the clearance flank surface of the mating fastening member, the swelling portion can be further strongly pressed against the clearance flank surface of the mating fastening member.

[Twelfth Aspect]

In the twelfth aspect, in addition to the configuration of the eleventh aspect, a cut surface is formed by cutting away a portion of the fastening member in the vicinity of the thread crest along a line extending obliquely downward toward the pressure flank surface.

According to the twelfth aspect, when the fastening member is tightened into the mating fastening member, the pressure flank surface of the fastening member is pressed against the pressure flank surface of the mating fastening member as the seat surface is tightened to increase a torque.

In this event, the pressure flank surface of the fastening member first contacts the pressure flank surface of the mating fastening member not at a portion that is in the vicinity of the upper end of the cut surface serving as the thread crest but at the upper end of the pressure flank surface.

Accordingly, as the fastening member is tightened into the mating fastening member, the pressure flank surface of the fastening member contacts, and is pressed against, the pressure flank surface of the mating fastening member gradually from the upper end side to the lower end side, which causes the screw thread of the fastening member to rise up to the clearance side. Thus, the thread crest of the fastening member moves toward the clearance flank surface of the mating fastening member so that the clearance flank surface of the fastening member contacts the clearance flank surface of the mating fastening member.

As a result, the screw thread of the fastening member obtains a friction force from both the pressure flank surface and the clearance flank surface, which yields a further loosening prevention effect.

The method of manufacturing the fastening member according to the present invention is not specifically limited, and any known method such as flat-die, round-die, planetary-die, and rotary-die rolling, cutting, casting, forging, and injection molding may be employed.

Various examples of the present invention will be described in detail below with reference to the drawings. In the description of the various examples, the same constituent components and elements are denoted by the same reference numerals to avoid repeating the same description.

The various examples may be appropriately combined for implementation, in which case the respective functions and effects of the combined examples or a synergistic effect may be obtained.

First Example

FIG. 1 is a front view of a bolt 1 including a screw thread 10 according to Example 1 in an unfastened state.

The bolt 1 serving as a fastening member has a male thread structure, and includes a head portion 2, a cylindrical portion 3, and a thread portion 4. A seat surface 20 is formed on the back surface of the head portion 2. The screw thread 10 is formed on the thread portion 4.

Figure 2:
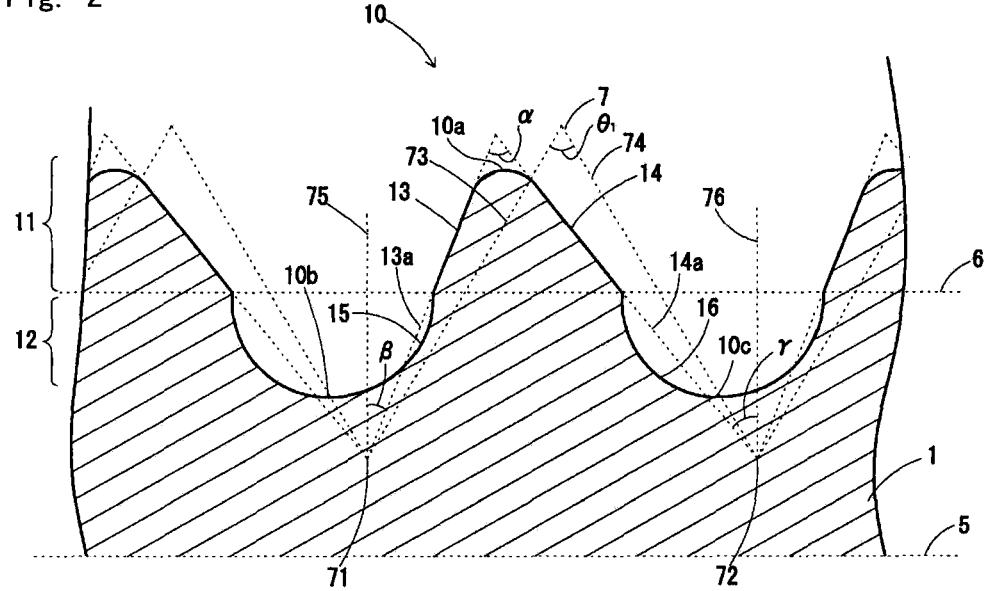
FIG. 2 is an enlarged cross-sectional view of a portion A indicated by the broken line in FIG. 1 and including an axis 5.

FIG. 2 is an enlarged cross-sectional view of a portion A indicated by the broken line in FIG. 1 and including an axis 5.

The broken line indicated by reference numeral 6 denotes an imaginary cylinder defining the effective diameter of a basic profile, and the broken line indicated by reference numeral 7 denotes the basic profile. The basic profile 7 has a shape complying with the JIS standards, with the angle $\theta_1$ of the screw thread 10 being 60° and both the flank angle of a pressure flank surface 73 and the flank angle of a clearance flank surface 74 being 30°. The broken lines indicated by reference numerals 75 and 76 denote imaginary lines that are perpendicular to the axial direction of the thread.

The screw thread 10 has an upper portion 11 provided on the side of a thread crest 10a with respect to the imaginary cylinder 6 and a lower portion 12 provided on the side of roots 10b and 10c with respect to the imaginary cylinder 6.

The upper portion 11 includes a pressure flank surface 13 and a clearance flank surface 14.

The pressure flank surface 13 is formed along an imaginary line 13a passing through a root 71 of the basic profile 7, with the angle β formed between the imaginary line 13a and the imaginary line 75 being about 22°.

The clearance flank surface 14 is formed along an imaginary line 14a passing through a root 72 of the basic profile 7, with the angle γ formed between the imaginary line 14a and the imaginary line 76 being about 38°.

The angle α formed between the imaginary line 13a and the imaginary line 14a is about 60°.

In the screw thread 10, the angle α is equivalent to the angle of the screw thread of the upper portion 11, the angle β is equivalent to the flank angle of the pressure flank surface 13, and the angle γ is equivalent to the flank angle of the clearance flank surface 14.

The pitch of the screw thread 10 is the same as the pitch of the screw thread of the basic profile 7.

The screw thread 10 according to Example 1 has a shape obtained by inclining the basic profile 7 to the side of the seat surface 20 (pressure side) using the roots 71 and 72 of the basic profile 7 as base points while maintaining the angle $\theta_1$ (=α) of the screw thread of the basic profile 7.

When viewed differently, while the crest of the basic profile 7 is positioned radially outwardly of the middle between the roots 71 and 72, the crest 10a of the screw thread according to Example 1 is shifted toward the root 71, which is closer to the seat surface 20, using the roots 71 and 72 of the basic profile 7 as base points.

The lower portion 12 includes a side surface 15 on the side of the seat surface (pressure side) and a side surface 16 on the side of the screw distal end (clearance side).

The side surface 15 is formed to be curved inward from the imaginary line 13a which is equivalent to the extension line of the pressure flank surface 13. The side surface 15 has the shape of a round surface that is continuous with the clearance side surface of an adjacent screw thread (not shown). The bottom of the side surface 15 is defined as the root 10b.

The side surface 16 is formed to be curved inward from the imaginary line 14a which is equivalent to the extension line of the clearance flank surface 14. The side surface 16 has the shape of a round surface that is continuous with the side surface on the side of the screw distal end of an adjacent screw thread (not shown). The bottom of the side surface 16 is defined as the root 10c.

Figure 3:
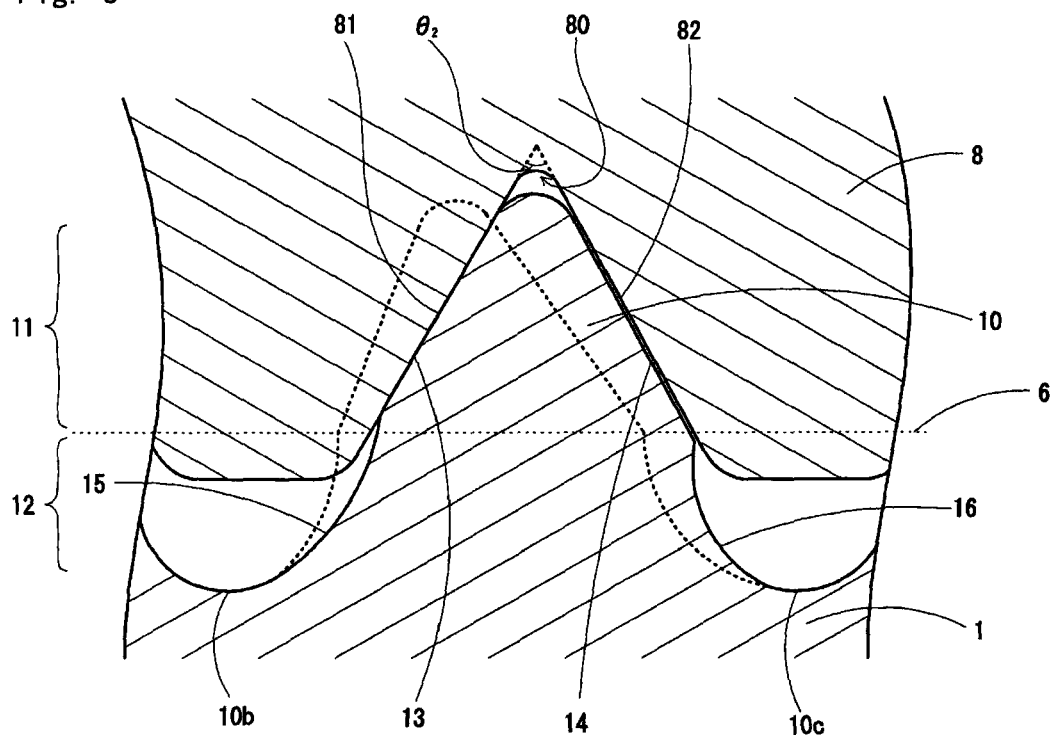
FIG. 3 is a cross-sectional view showing the screw thread 10 in a state in which the bolt 1 according to Example 1 and a nut 8 serving as a mating fastening member are fastened to each other.

FIG. 3 is a cross-sectional view showing the screw thread 10 in a state in which the bolt 1 according to Example 1 and a nut 8 serving as a mating fastening member are fastened to each other.

The nut 8 is a mating fastening member having a female thread structure complying with the JIS standards, with the angle $\theta_2$ of a root 80 of the nut 8 being 60°.

When the bolt 1 is tightened into the nut 8, a pressure flank surface 81 of the nut 8 presses the pressure flank surface 13 of the screw thread 10.

Both the side surfaces 15 and 16 of the lower portion 12 have the shape of a round surface recessed inward, and thus the lower portion 12 is dented inward to be thinner than the basic profile 7.

This allows the entire screw thread 10 to be elastically deformed in response to the pressing by the pressure flank surface 81 of the nut 8.

As a result, as shown in FIG. 3, the screw thread 10 is deformed from an unfastened state indicated by the broken line to a fastened state indicated by the solid line in which the entire screw thread 10 has risen up along the pressure flank surface 81 of the nut 8.

Accordingly, a reaction force (spring-back) against the pressure flank surface 81 of the nut 8 is generated in the screw thread 10 to increase the friction force between the pressure flank surface 13 of the screw thread 10 and the pressure flank surface 81 of the nut 8, which yields a significant loosening prevention effect.

The pressure flank surface 13 of the screw thread 10 and the pressure flank surface 81 of the nut 8 necessarily contact each other even if overtap is provided. Therefore, a reaction force (spring-back) against the pressure flank surface 81 of the nut 8 is generated in the screw thread 10 irrespective of the size of the gap between the pressure flank surfaces 13 and 81, which demonstrates a loosening prevention effect.

Thus, the loosening prevention effect is not reduced even if overtap is provided in the nut 8, and therefore hot-dip galvanizing can be effectively performed on the bolt 1 and the nut 8.

The upper portion 11 of the screw thread 10 is provided on the side of the thread crest 10a with respect to the imaginary cylinder 6 defining the effective diameter of the basic profile 7, and therefore the pressure flank surface 13 is secured sufficiently.

Accordingly, as shown in FIG. 3, the contact area between the pressure flank surface 13 of the screw thread 10 and the pressure flank surface 81 of the nut 8 is secured in the fastened state, which results in a high friction force.

Further, the angle α of the screw thread 10 is 60°, which is generally the same as the angle of the root 80 of the nut 8, and therefore a space allowing elastic deformation of the entire screw thread 10 is secured in the thread root of the nut 8. In addition, generally the entirety of the pressure flank surface 13 of the screw thread 10 contacts the pressure flank surface 81 of the nut 8 in the fastened state, which results in a further higher friction force to yield a significant loosening prevention effect.

As shown in FIG. 2, in the unfastened state, the flank angle β of the pressure flank surface 13 of the screw thread 10 is about 22°, and the flank angle γ of the clearance flank surface 14 of the screw thread 10 is about 38°.

These flank angles are different from the references according to the JIS standards, but fall within the gap between the bolt 1 and the nut 8. Therefore, the friction torque between the bolt 1 and the nut 8 is small to allow stress-free screwing before a seat surface tightening force is generated.

After further screwing, a seat surface tightening force is generated to yield a significant loosening prevention effect due to elastic deformation of the screw thread 10 as described above.

Consequently, the bolt 1 including the screw thread 10 according to Example 1 yields two contradictory functions and effects, that is, being easily screwed into the nut 8 and loosening prevention.

Since the screw thread 10 itself is elastically deformed, the load imposed on the screw thread 10 of the bolt 1 is dispersed to other screw threads 10 contacting the side surfaces of a plurality of thread roots of the nut 8. Accordingly, concentration of the load on the screw thread 10 (first screw thread) positioned closest to the seat surface, of the screw threads 10 of the bolt 1 contacting the nut 8, is relaxed, which improves the fatigue strength of the bolt 1.

Further, the friction force on the seat surface 20 (see FIG. 1) is also increased by the reaction force (spring-back) of the screw thread 10. This prevents initial loosening due to wear or deformation of the seat surface 20, and in turn prevents a breakage of the bolt 1 due to the initial loosening, which improves the reliability. The absence of initial loosening eliminates the need for additional tightening, which improves the workability.

In the fastened state shown in FIG. 3, the material forming the screw thread 10 of the bolt 1 is elastically deformed. When brought back to the unfastened state shown in FIG. 2, however, the original state, that is, a state in which the pressure flank surface 13 is positioned on the side of the seat surface with respect to the pressure flank surface 73 of the basic profile 7, is restored by the elastic force of the lower portion 12 of the screw thread 10.

This allows repeated use without the need to perform a special treatment on the screw thread 10. In the fastened state, the lower portion 12 of the screw thread 10 is elastically deformed. Therefore, the pressure flank surface 81 of the nut 8 is unlikely to be damaged, and the loosening prevention effect is not reduced even after repeated use.

While the present invention is applied to a right-hand thread bolt 1 in Example 1, the present invention may also be applied to a left-hand thread bolt, in which case the same functions and effects as those for a right-hand thread bolt are obtained.

Second Example

Figure 4:
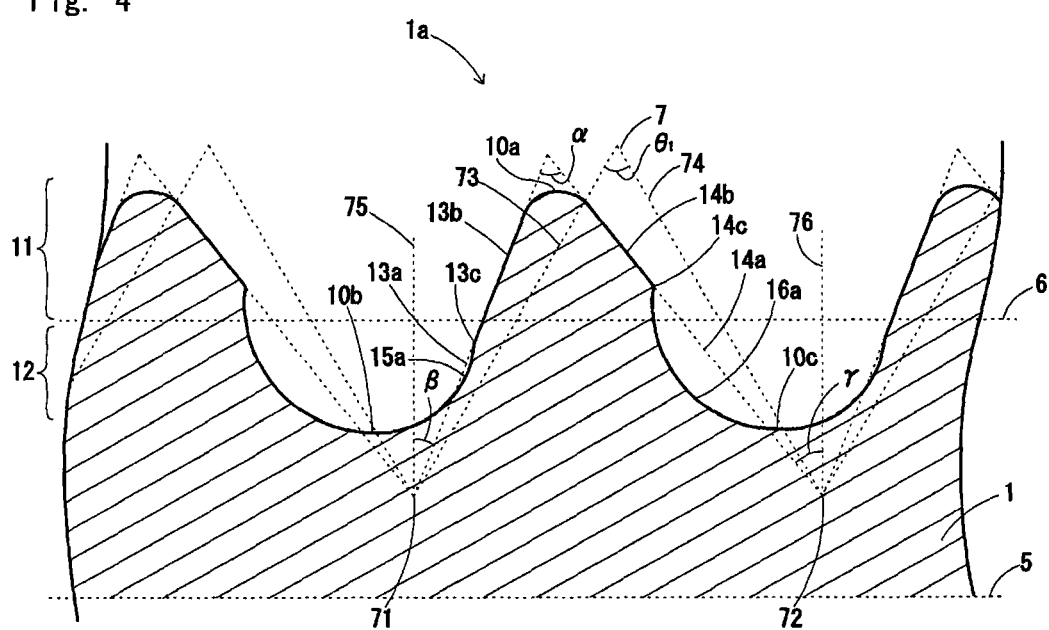
FIG. 4 is a cross-sectional view showing an essential portion of the bolt 1 including a screw thread 1a according to Example 2 of the present invention in an unfastened state and including the axis 5.

FIG. 4 is a cross-sectional view showing an essential portion of the bolt 1 including a screw thread 1a according to Example 2 in an unfastened state and including the axis 5.

A lower end 13c of a pressure flank surface 13b of the screw thread 1a is positioned below (on the side of the axis 5 with respect to) the imaginary cylinder 6. That is, the pressure flank surface 13b is formed from the upper portion 11 to the lower portion 12.

A side surface 15a is formed on the pressure side of the lower portion 12 of the screw thread 1a. The side surface 15a has the shape of a round surface that is continuous from the lower end 13c of the pressure flank surface 13b to the root 10b and that is curved inwardly of the imaginary line 13a.

That is, the side surface 15a is formed only in the lower portion 12 of the screw thread 1a.

A lower end 14c of a clearance flank surface 14b of the screw thread 1a is positioned above (on the side of the thread crest 10a with respect to) the imaginary cylinder 6. That is, the clearance flank surface 14b is formed only in the upper portion 11.

A side surface 16a is formed on the clearance side of the screw thread 1a from the upper portion 11 to the lower portion 12. The side surface 16a has the shape of a round surface that is continuous from the lower end 14c of the clearance flank surface 14b to the root 10c and that is curved inwardly of the imaginary line 14a.

That is, the side surface 16a is formed on the screw thread 1a from the upper portion 11 to the lower portion 12.

Consequently, the root between adjacent screw threads is positioned on the side of the seat surface in the screw thread 1a according to Example 2 compared to the screw thread 10 according to Example 1 (see FIG. 2).

According to the screw thread 1a of Example 2, the same functions and effects as those of the screw thread 10 according to Example 1 are obtained.

In the screw thread 1a according to Example 2, the pressure side surface 15a of the lower portion 12 is dented to a small degree compared to the side surface 15 of the screw thread 10 according to Example 1.

Accordingly, the pressure flank surface 13b of the screw thread 1a according to Example 2 is formed to be wider than the pressure flank surface 13 of the screw thread 10 according to Example 1.

As a result, with a bolt including the screw thread 1a according to Example 2 fastened to a nut, the contact area with the flank surface of the nut is increased to further increase the friction force, which further improves the loosening prevention effect.

In the screw thread 1a according to Example 2, the clearance side surface 16a of the lower portion 12 is dented to a great degree compared to the side surface 16 of the screw thread 10 according to Example 1. This permits the screw thread 1a to be elastically deformed to the clearance side in the lower portion 12.

This allows the screw thread 1a according to Example 2 to be warped to the clearance side to further increase the reaction force (spring-back), which further improves the loosening prevention effect.

As with the side surfaces 15 and 16 according to Example 1, the shape of the side surfaces 15a and 16a according to Example 2 is not limited to a round surface shape, and may be a complex round surface shape or a shape in which a round surface and a flat surface are combined.

Third Example

Figure 5A:
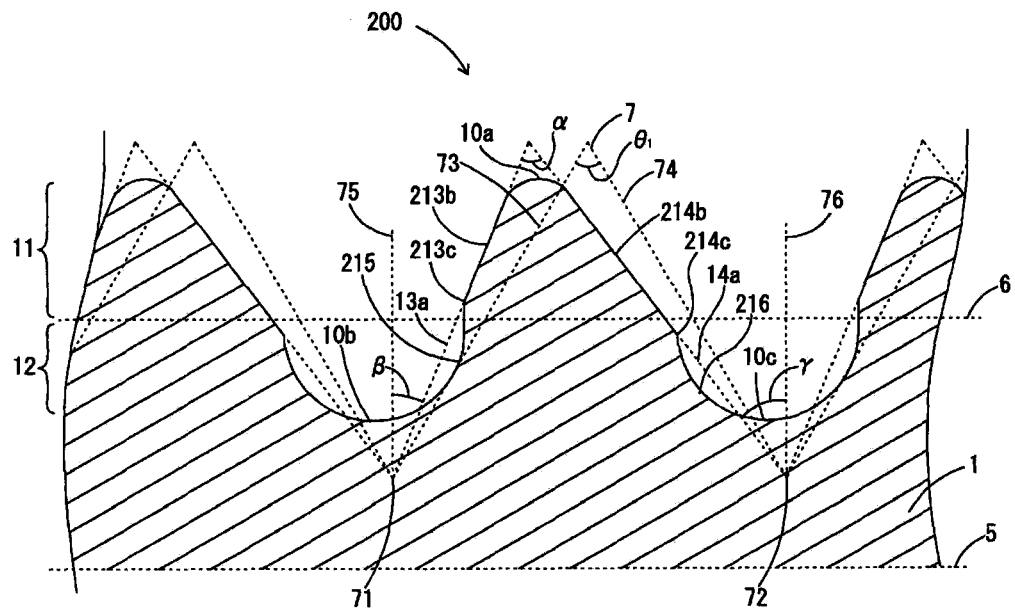
FIG. 5A is a cross-sectional view showing an essential portion of the bolt 1 including a screw thread 200 according to Example 3 of the present invention in an unfastened state and including the axis 5.

FIG. 5A is a cross-sectional view showing an essential portion of the bolt 1 including a screw thread 200 according to Example 3 in an unfastened state and including the axis 5.

A pressure flank surface 213b of the screw thread 200 is formed along the imaginary line 13a.

A lower end 213c of the pressure flank surface 213b is positioned on the side of the thread crest 10a with respect to the imaginary cylinder 6.

A pressure side surface 215 of the lower portion 12 of the screw thread 200 is shaped to be curved inwardly of the imaginary line 13a from the lower end 213c of the pressure flank surface 213b to the root 10b, and has a shape in which a round surface and a flat surface are combined.

Figure 5B:
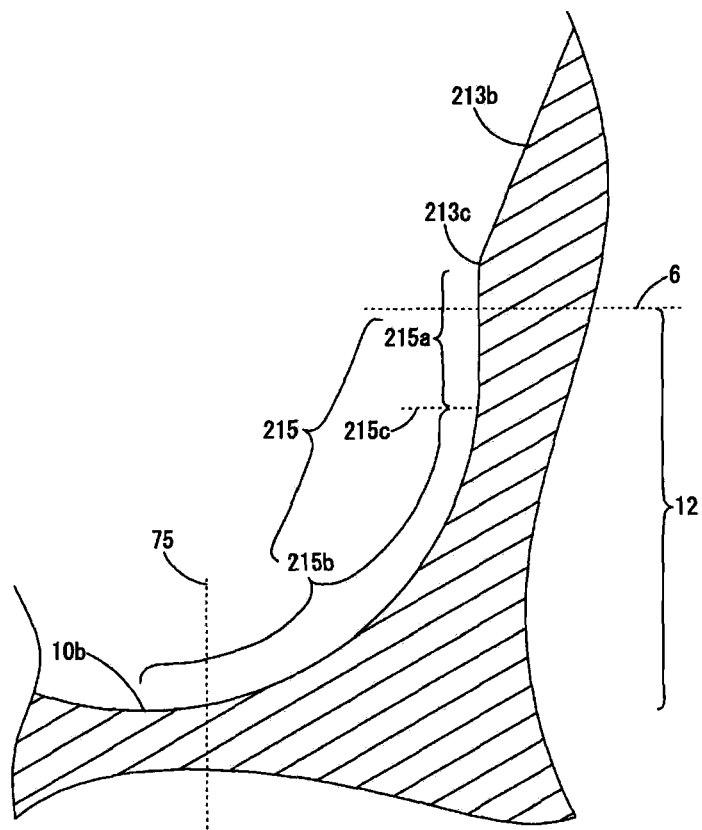
FIG. 5B is an enlarged cross-sectional view of a pressure side surface 215 of the screw thread 200 according to Example 3.

FIG. 5B is an enlarged cross-sectional view of the pressure side surface 215 of the lower portion 12 of the screw thread 200 according to Example 3.

The pressure side surface 215 of the lower portion 12 includes a flat surface 215a and a round surface 215b.

The flat surface 215a is a surface that is parallel to the imaginary line 75 which is perpendicular to the axial direction of the thread, and formed to extend from the lower end 213c toward the root 10b to a position (reference numeral 215c) at two-thirds the height of the lower portion 12.

The round surface 215b is a circumferential surface with a radius of curvature of 0.4 mm, and formed from the position indicated by reference numeral 215c to the root 10b so as to be continuous with the flat surface 215a.

In the screw thread 200 according to Example 3, a clearance flank surface 214b is formed along the imaginary line 14a.

A lower end 214c of the clearance flank surface 214b is positioned on the side of the axis 5 with respect to the imaginary cylinder 6. As with the pressure side surface 215, a clearance side surface 216 of the lower portion 12 is shaped to be curved inwardly of the imaginary line 14a from the lower end 214c of the clearance flank surface 214b to the root 10c, and has a shape in which a round surface and a flat surface are combined.

In the screw thread 200 according to Example 3, the lower end 213c of the pressure flank surface 213b is positioned on the side of the thread crest 10a with respect to the lower end 214c of the clearance flank surface 214b.

According to the bolt 1 including the screw thread 200 of Example 3, the pressure side surface 215 of the lower portion 12 is dented over a wide range compared to the clearance side surface 216 of the lower portion 12, which makes the pressure side surface 215 of the lower portion 12 further thinner and the clearance side surface 216 thicker than the pressure side.

This allows the entire screw thread 200 to be warped to the clearance side in the fastened state and more strongly sprung back to the pressure side, which yields a further significant loosening prevention effect.

Fourth Example

Figure 6:
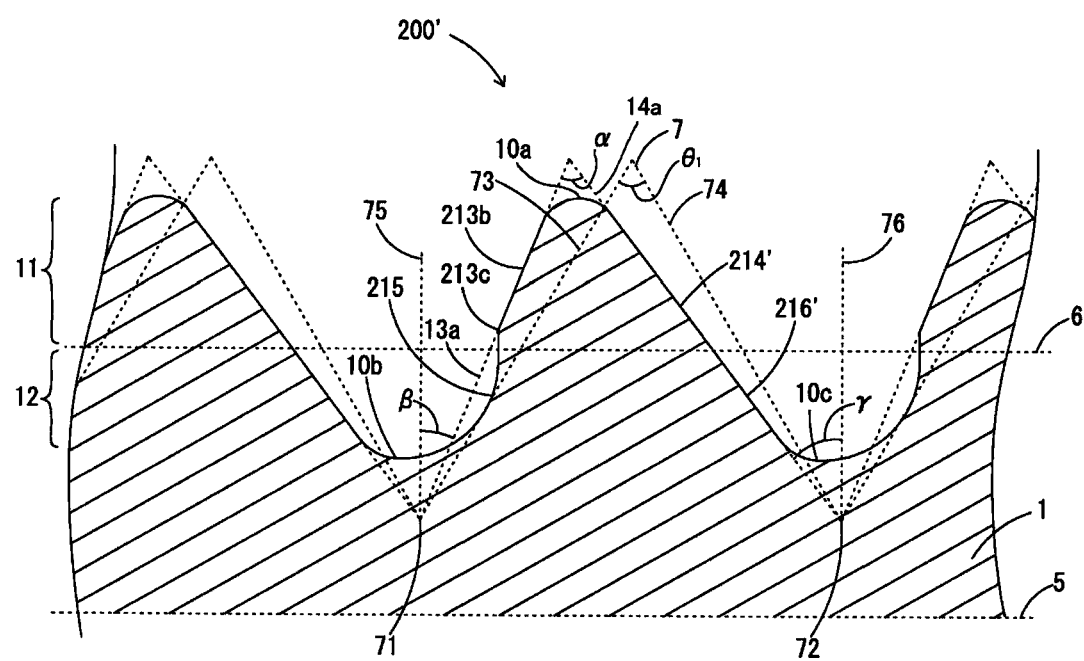
FIG. 6 is a cross-sectional view showing an essential portion of the bolt 1 including a screw thread 200' according to Example 4 of the present invention in an unfastened state and including the axis 5.

FIG. 6 is a cross-sectional view showing an essential portion of the bolt 1 including a screw thread 200' according to Example 4 in an unfastened state and including the axis 5.

The screw thread 200' according to Example 4 is different from the screw thread 200 (see FIG. 5A) according to Example 3 in that the lower portion 12 of the screw thread 200' is not curved inward or dented on the clearance side so that a clearance flank surface 214' is extended to form a clearance side surface 216' of the lower portion 12 with the clearance flank surface 214' and the clearance side surface 216' flush with each other.

Other features of the screw thread 200' according to Example 4 are the same as those of the screw thread 200 according to Example 3.

According to the screw thread 200' of Example 4, when the seat surface is tightened to increase a torque in the fastened state, the pressure flank surface 213b is pressed against the pressure flank surface of a nut to generate a force for warping the screw thread 200' to the clearance side. Since the clearance side surface 216' of the lower portion 12 of the screw thread 200' is not curved inward or dented but has a flat surface shape, however, the screw thread 200' is warped to the clearance side to a reduced degree.

This prevents a reduction in amount of elastic deformation of the screw thread 200' due to secular changes, which makes it possible to keep a reaction force (spring-back) against the pressure flank surface of the nut.

The side surface 215 is formed on the pressure side of the screw thread 200' according to Example 4 from the upper portion 11 to the lower portion 12. The side surface 215 has the shape of a round surface that is continuous with the lower end 213c of the pressure flank surface 213b and the root 10b and that is curved inwardly of the imaginary line 13a.

With the pressure side surface 215 of the screw thread 200' curved inward or dented, when the seat surface is tightened to increase a torque, the screw thread 200' is pressed against the pressure flank surface of the nut to elastically deform the pressure side of the upper portion 11 of the screw thread 200' so as to extend along the pressure flank surface of the nut, which generates a high friction force.

That is, a portion of the pressure side surface 215 which is curved inward or dented permits elastic deformation of the pressure side of the upper portion 11 of the screw thread 200'. Such elastic deformation occurs sequentially in the order of a first screw thread, a second screw thread, a third screw thread, and so forth. As a result, a significant loosening prevention effect is obtained for the entire engagement portion between the bolt and the nut, and stresses do not concentrate on the first screw thread but are dispersed, which improves the fatigue strength.

The lower end 213c of the pressure flank surface 213b (the upper end of the clearance side surface 215) is preferably positioned on the pressure flank surface of the nut in the fastened state.

This is because such positioning secures the contact area between the pressure flank surface 213b of the screw thread 200' and the pressure flank surface of the nut in the fastened state to result in a sufficient friction force, and permits sufficient elastic deformation of the pressure side surface 215 of the lower portion 12.

Elastic deformation of the upper portion 11 of the screw thread 200' is facilitated by increasing the radius of curvature of the round surface shape of the pressure side surface 215 so that the pressure side surface 215 is curved or dented to a greater degree. This makes it possible to enhance the friction force generated between the pressure flank surface 213b of the upper portion 11 of the screw thread 200' and the pressure flank surface of the nut, which enhances the above effect.

Fifth Example

Figure 7A:
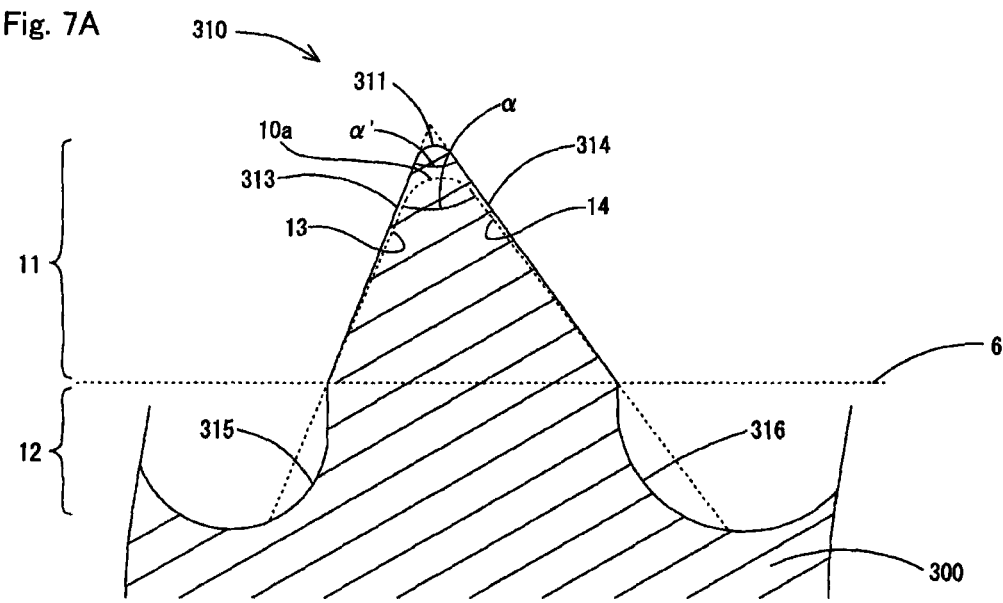
FIG. 7A is a cross-sectional view showing an essential portion of a bolt 300 including a screw thread 310 according to Example 5 of the present invention in an unfastened state.

FIG. 7A is a cross-sectional view showing an essential portion of a bolt 300 including a screw thread 310 according to Example 5 in an unfastened state.

The angle $\alpha$ of the screw thread 310 according to Example 5 is about 58°, which is slightly smaller than the angle $\alpha$ (=60°) of the screw thread 10 (see FIG. 2) according to Example 1 indicated by the broken line. The pitch of the screw thread 310 complies with the JIS standards.

Therefore, the thread crest 311 of the screw thread 310 according to Example 5 is higher than the thread crest 10a of the screw thread 10 according to Example 1, and the outside diameter of the bolt 300 according to Example 5 is larger than the JIS standards.

Other features of the screw thread 310 according to Example 5 are the same as the screw thread 10 according to Example 1. A pressure side surface 315 and a clearance side surface 316 of the lower portion 12 of the screw thread 310 are formed to be curved inward from an imaginary line that is equivalent to the extension line of the corresponding flank surface.

Figure 7B:
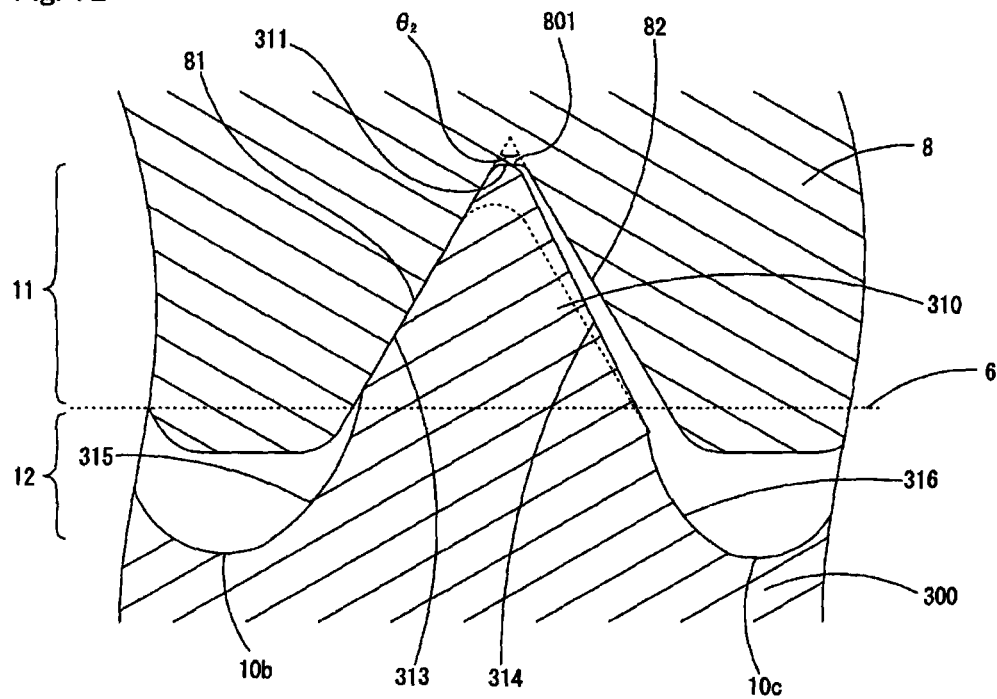
FIG. 7B is a cross-sectional view showing the screw thread 310 in a state in which the bolt 300 according to Example 5 and the nut 8 are fastened to each other.

FIG. 7B is a cross-sectional view showing the screw thread 310 in a state in which the bolt 300 according to Example 5 and the nut 8 are fastened to each other.

The nut 8 is a nut complying with the JIS standards or the ISO standards. The bolt 300 can be tightened into the nut 8 with little resistance before a force is applied to the seat surface of the bolt 300. As the seat surface is tightened to increase a torque, however, a pressure flank surface 313 is pressed against the pressure flank surface 81 of the nut 8 to cause the screw thread 310 to rise up to the clearance side.

Accordingly, the screw thread 310 is sprung back to the pressure side, which increases the friction force between the pressure flank surface 313 of the bolt 300 and the pressure flank surface 81 of the nut 8.

With the screw thread 310 further rising up to the clearance side, the outside diameter of the thread is increased, which causes the thread crest 311 of the bolt 300 to contact a root 801 of the nut 8 to be restrained by the root 801. Such a restraining force is added to the friction force between the pressure flank surface 313 and the pressure flank surface 81 to prevent radial loosening of the bolt 300, which yields a further significant loosening prevention effect as a whole.

In the case where the torque for tightening the seat surface is low or the bolt is made of a material that is not easily elastically deformed, the screw thread 310 may rise up to a smaller degree, and the friction force between the pressure flank surface 313 and the pressure flank surface 81 of the nut 8 may become smaller.

According to the bolt 300 of Example 5, however, radial loosening of the bolt 300 is prevented with the thread crest 311 of the bolt 300 restrained by the root 801 in addition to the friction force between the pressure flank surface 313 and the pressure flank surface 81 of the nut 8, which results in a sufficient loosening prevention effect.

Sixth Example

Figure 8A:
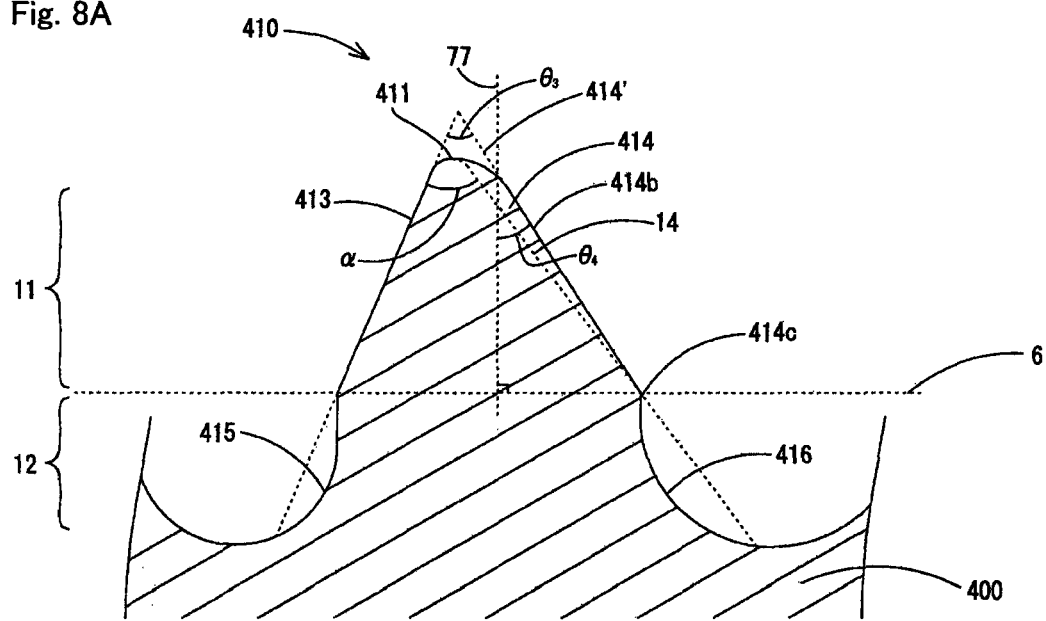
FIG. 8A is a cross-sectional view showing an essential portion of a bolt 400 including a screw thread 410 according to Example 6 of the present invention in an unfastened state.

FIG. 8A is a cross-sectional view showing an essential portion of a bolt 400 including a screw thread 410 according to Example 6 in an unfastened state.

The screw thread 410 according to Example 6 is obtained by providing a swelling portion 414 on the clearance flank surface 14 (see FIG. 2) of the screw thread 10 according to Example 1.

A surface 414b of the swelling portion 414 is formed along an imaginary line 414'.

The angle $\theta_4$ formed between an imaginary line 77 that is perpendicular to the axial direction of the thread and the imaginary line 414' is about 30°, and the angle $\theta_3$ formed between the extension line of a pressure flank surface 413 and the imaginary line 414' is 54°.

A thread crest 411 of the screw thread 410 according to Example 6 is formed to have the same height as the thread crest 10a (see FIG. 2) of the screw thread 10 according to Example 1.

The swelling portion 414 is formed to swell to a gradually increasing degree from a lower end 414c of the clearance flank surface toward the thread crest 411 so that the thread crest 411 and the surface 414b of the swelling portion 414 are smoothly continuous with each other.

Other features of the screw thread 410 according to Example 6 are the same as the screw thread 10 according to Example 1. A pressure side surface 415 and a clearance side surface 416 of the lower portion 12 of the screw thread 410 are formed to be curved inward from an imaginary line that is equivalent to the extension line of the corresponding flank surface.

Figure 8B:
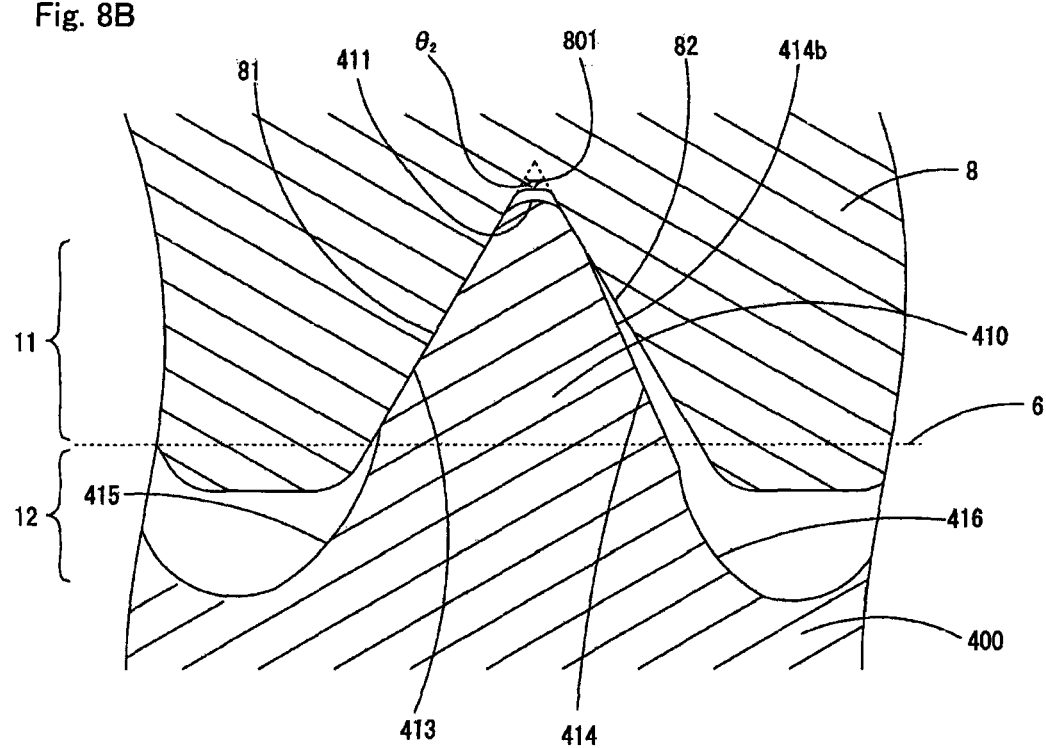
FIG. 8B is a cross-sectional view showing the screw thread 410 in a state in which the bolt 400 according to Example 6 and the nut 8 are fastened to each other.

FIG. 8B is a cross-sectional view showing the screw thread 410 in a state in which the bolt 400 according to Example 6 and the nut 8 are fastened to each other.

When the bolt 400 is tightened into the nut 8, the screw thread 410 rises up to the clearance side to be sprung back to the pressure side as the seat surface is tightened to increase a torque, which increases the friction force between the pressure flank surface 413 and the pressure flank surface 81 of the nut 8.

With the screw thread 410 further rising up to the clearance side, the swelling portion 414 which is provided on the clearance side of the screw thread 410 moves closer to a clearance flank surface 82 of the nut 8 so that the surface 414b of the swelling portion 414 is pressed against the clearance flank surface 82 of the nut 8.

As a result, the screw thread 410 obtains a friction force from both the pressure flank surface 413 and the surface 414b of the swelling portion 414, which yields a further loosening prevention effect.

The angle $\theta_4$ formed by the surface 414b of the swelling portion 414 is about 30°. Therefore, the surface 414b of the swelling portion 414 is parallel to the clearance flank surface 82 of the nut 8 before a force is applied to the seat surface of the bolt 400 to tighten the seat surface which causes the screw thread 410 to rise up.

This prevents interference between the surface 414b of the swelling portion 414 and the clearance flank surface 82 of the nut 8 before the seat surface is tightened, which facilitates tightening.

The swelling portion 414 is formed to swell to a gradually increasing degree from the lower end 414c of the clearance flank surface toward the thread crest 411. Therefore, the swelling portion 414 is further strongly pressed against the clearance flank surface 82 of the nut 8 when the seat surface is tightened to cause the screw thread 410 to rise up, which generates a high friction force to yield a further loosening prevention effect, compared to a case where the swelling portion 414 is formed to swell to a gradually increasing degree from the thread crest 411 toward the lower end 414c of the clearance flank surface.

Seventh Example

Figure 9A:
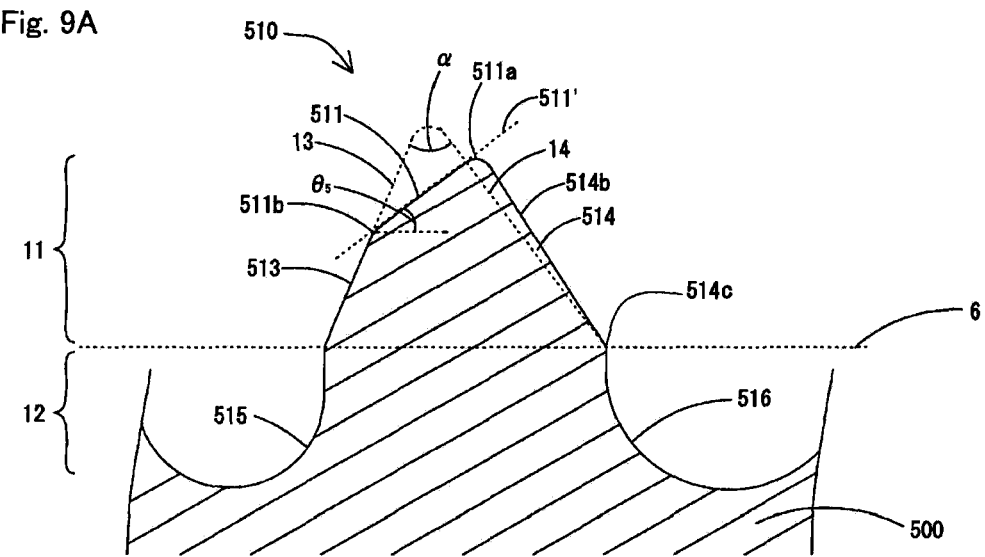
FIG. 9A is a cross-sectional view showing an essential portion of a bolt 500 including a screw thread 510 according to Example 7 of the present invention in an unfastened state.

FIG. 9A is a cross-sectional view showing an essential portion of a bolt 500 including a screw thread 510 according to Example 7 in an unfastened state.

The screw thread 510 according to Example 7 has a shape obtained by providing a swelling portion 514 on the clearance flank surface 14 (see FIG. 2) of the screw thread 10 according to Example 1 as with the swelling portion 414 (see FIGS. 8A and 8B) of the screw thread 410 according to Example 6.

However, the screw thread 510 according to Example 7 has a shape obtained by cutting away a portion of the screw thread 410 according to Example 6 in the vicinity of the thread crest 411 along an imaginary line 511' extending obliquely downward toward a pressure flank surface 513.

The imaginary line 511' passes through the vicinity of the middle portion of the pressure flank surface 13 (see FIG. 2) of the screw thread 10 according to Example 1 indicated by the broken line. The angle $\theta_5$ formed between an imaginary line that is parallel to the imaginary cylinder 6 and the imaginary line 511' is 45°.

A cut surface 511 formed along the imaginary line 511' is a flat surface facing the pressure side (on the side of the seat surface of the bolt 500), with an upper end 511a of the cut surface 511 serving as the thread crest of the screw thread 510.

A lower end 511b of the cut surface 511 is positioned in the vicinity of the middle portion of the pressure flank surface 13 of the screw thread 10 according to Example 1 indicated by the broken line.

The swelling portion 514 is formed to swell to a gradually increasing degree from a lower end 514c of the clearance flank surface toward the upper end 511a of the cut surface 511 so that the upper end 511a of the cut surface 511 and a surface 514b of the swelling portion 514 are smoothly continuous with each other.

A pressure side surface 515 and a clearance side surface 516 of the lower portion 12 of the screw thread 510 are formed to be curved inward from an imaginary line that is equivalent to the extension line of the corresponding flank surface.

Figure 9B:
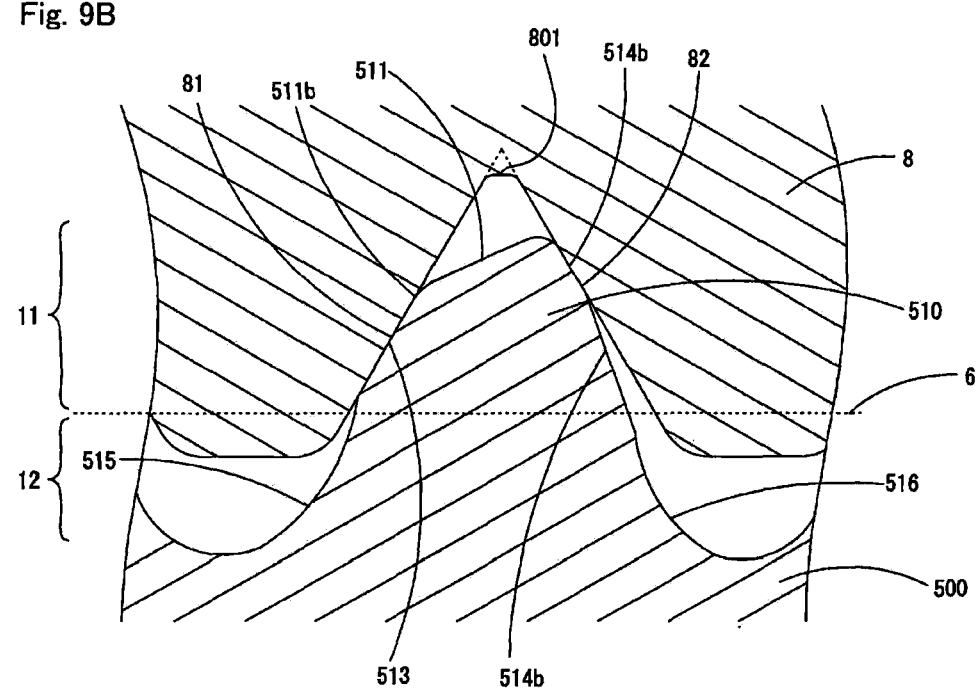
FIG. 9B is a cross-sectional view showing the screw thread 510 in a state in which the bolt 500 according to Example 7 and the nut 8 are fastened to each other.

FIG. 9B is a cross-sectional view showing the screw thread 510 in a state in which the bolt 500 according to Example 7 and the nut 8 are fastened to each other.

When the bolt 500 is tightened into the nut 8, the pressure flank surface 513 is pressed against the pressure flank surface 81 of the nut 8 as the seat surface is tightened to increase a torque.

In this event, the pressure flank surface 513 first contacts the pressure flank surface 81 of the nut 8 not at a portion that is in the vicinity of the thread crest (the upper end 511a of the cut surface 511) of the screw thread 510 but at the upper end of the pressure flank surface 513.

Accordingly, as the bolt 500 is tightened into the nut 8, the pressure flank surface 513 contacts, and is pressed against, the pressure flank surface 81 of the nut 8 gradually from the upper end side to the lower end side, which causes the screw thread 510 to rise up to the clearance side. Thus, the thread crest of the screw thread 510 moves toward the clearance flank surface 82 of the nut 8 so that the surface 514b of the swelling portion 514 contacts the clearance flank surface 82 of the nut 8.

As a result, the screw thread 510 obtains a friction force from both the pressure flank surface 513 and the surface 514b of the swelling portion 514, which yields a further loosening prevention effect.

Eighth Example

Figure 10A:
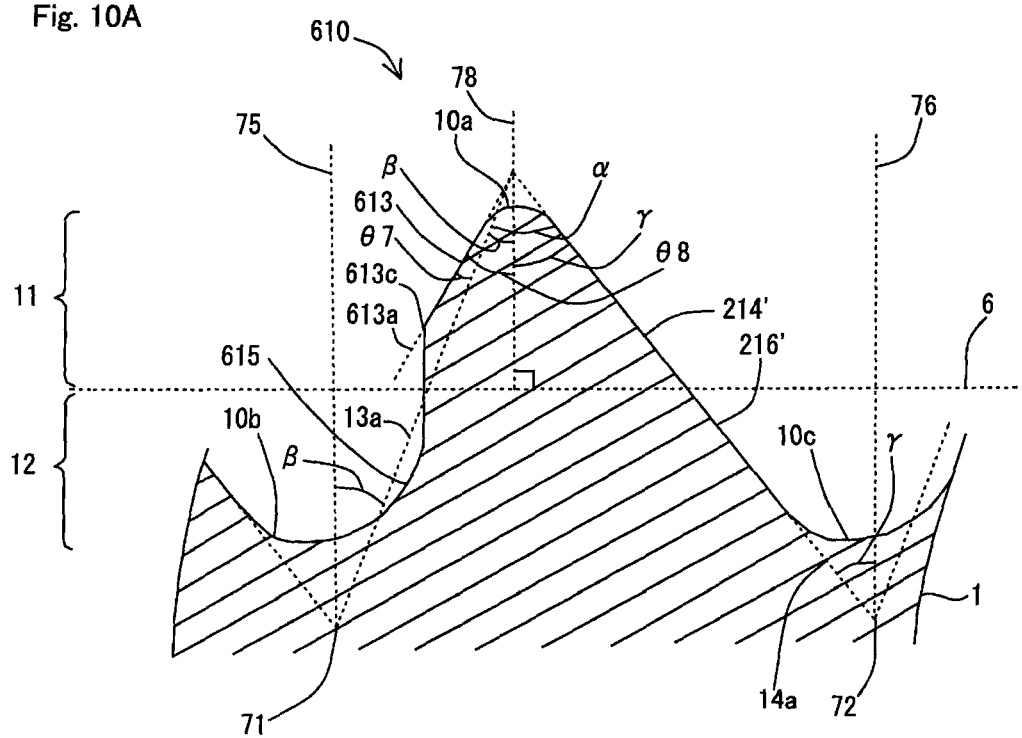
FIG. 10A is a cross-sectional view showing an essential portion of the bolt 1 including a screw thread 610 according to Example 9 of the present invention in an unfastened state.

FIG. 10A is a cross-sectional view showing an essential portion of the bolt 1 including a screw thread 610 according to Example 8 in an unfastened state.

The screw thread 610 according to Example 8 is the same as the screw thread 200' (see FIG. 69) according to Example 4 in that the lower portion 12 of the screw thread 610 is not curved inward or dented on the clearance side so that the clearance flank surface 214' is extended to form the clearance side surface 216' of the lower portion 12 with the clearance flank surface 214' and the clearance side surface 216' flush with each other.

The screw thread 610 according to Example 8 has a shape obtained by increasing the flank angle of the pressure flank surface 213b of the screw thread 200' according to Example 4.

As shown in FIG. 6, the pressure flank surface 213b of the screw thread 200' according to Example 4 is formed along the imaginary line 13a, and the flank angle β of the pressure flank surface 213b is about 22°, which is the same as in the screw thread 10 (see FIG. 2) according to Example 1.

The clearance flank surface 214' of the screw thread 200' is formed along the imaginary line 14a, and the flank angle γ of the clearance flank surface 214' is about 38°, which is the same as in the screw thread 10.

The angle α of the screw thread of the upper portion 11 of the screw thread 200' is about 60°, which is the same as in the screw thread 10.

In contrast, a pressure flank surface 613 of the screw thread 610 according to Example 8 is formed along an imaginary line 613a formed by adding the angle $\theta_7$ (=about 8°) to the angle β of the imaginary line 13a, and the flank angle $\theta_8$ (=β+$\theta_7$) of the pressure flank surface 613 is about 30°.

The clearance flank surface 214' of the screw thread 610 is formed along the imaginary line 14a, and the flank angle γ of the clearance flank surface 214' is about 38°, which is the same as in the screw threads 10 and 200'.

The angle α+$\theta_7$ of the screw thread of the upper portion 11 of the screw thread 610 is about 68°.

Consequently, the angle α+$\theta_7$ (=about 68°) of the screw thread of the upper portion 11 of the screw thread 610 according to Example 8 is larger than the angle α (=60°) of the screw thread of the upper portion 11 of the basic profile 7 (see FIG. 2) by the angle $\theta_7$ (=about 8°).

The flank angle $\theta_8$ (=30°) of the pressure flank surface 613 of the screw thread 610 is half the angle $\theta_1$ (=60°) of the screw thread (see FIG. 2) of the basic profile 7, which is the same as the flank angle of the pressure flank surface 73 of the screw thread of the basic profile 7.

The angles β, γ, and $\theta_7$ may be set to respective optimum values calculated experimentally. The flank angle $\theta_8$ may be set to be generally the same as the flank angle of the pressure flank surface 73 of the screw thread of the basic profile 7.

As with the pressure side surface 215 (see FIG. 5B) of the lower portion 12 of the screw thread 200 according to Example 3, a pressure side surface 615 of the lower portion 12 of the screw thread 610 according to Example N is shaped to be curved inwardly of the imaginary line 613a from a lower end 613c of the pressure flank surface 613 to the root 10b, and has a shape in which a round surface and a flat surface are combined.

Figure 10B:
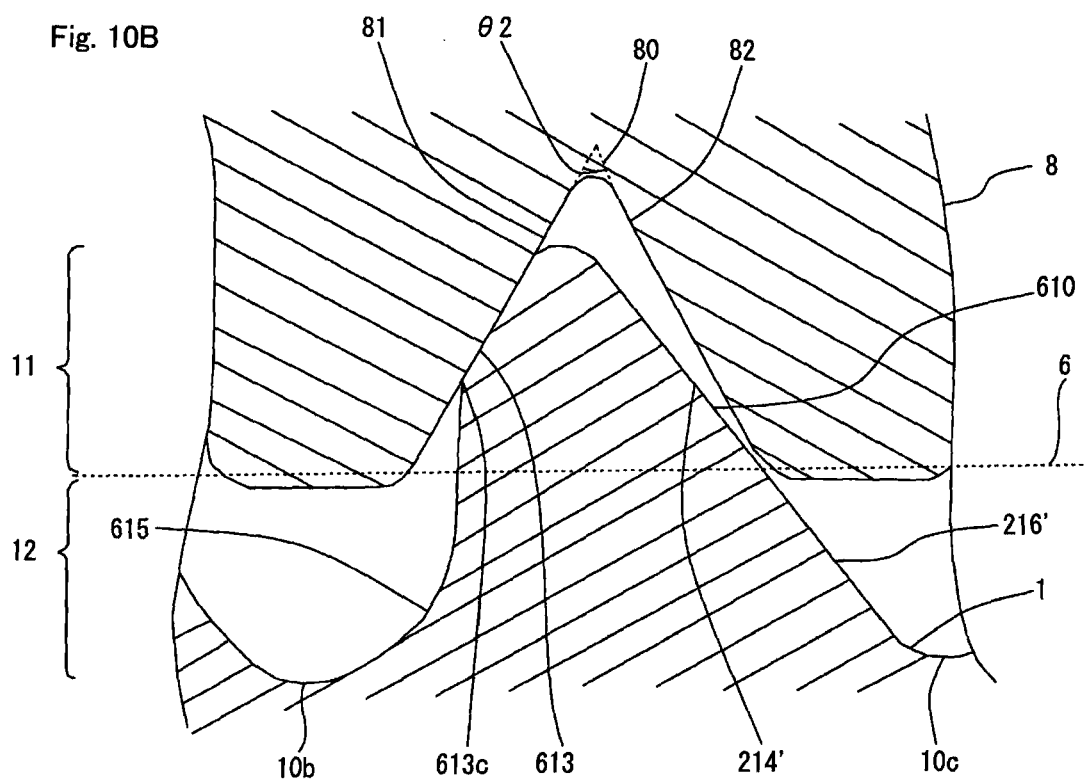
FIG. 10B is a cross-sectional view showing the screw thread 610 in a state in which the bolt 1 according to Example 8 and the nut 8 are fastened to each other.

FIG. 10B is a cross-sectional view showing the screw thread 610 in a state in which the bolt 1 according to Example 8 and the nut 8 are fastened to each other.

When the bolt 1 is tightened into the nut 8, the pressure flank surface 81 of the nut 8 presses the pressure flank surface 613 of the screw thread 610.

The flank angle $\theta_8$ of the pressure flank surface 613 of the screw thread 610 is generally the same as the flank angle of the pressure flank surface 613 of the screw thread of the basic profile 7, and thus the pressure flank surface 613 is parallel to the pressure flank surface 81 of the nut 8.

Therefore, generally the entirety of the pressure flank surface 613 of the screw thread 610 is pressed against the pressure flank surface 81 of the nut 8 to generate a stable strong pressing force, which results in a strong friction force between both the pressure flank surfaces 613 and 81.

With the pressure side surface 615 of the screw thread 610 curved inward or dented in Example 8 as in Example 4, when the seat surface is tightened to increase a torque, and the pressing force between the pressure flank surface 613 of the screw thread 610 and the pressure flank surface 81 of the nut 8 is increased, the pressure side of the upper portion 11 of the screw thread 610 is elastically deformed to result in a strong friction force between both the pressure flank surfaces 613 and 81, which generates a large reaction force (spring-back) to yield a further loosening prevention effect.

Ninth Example

Figure 11A:
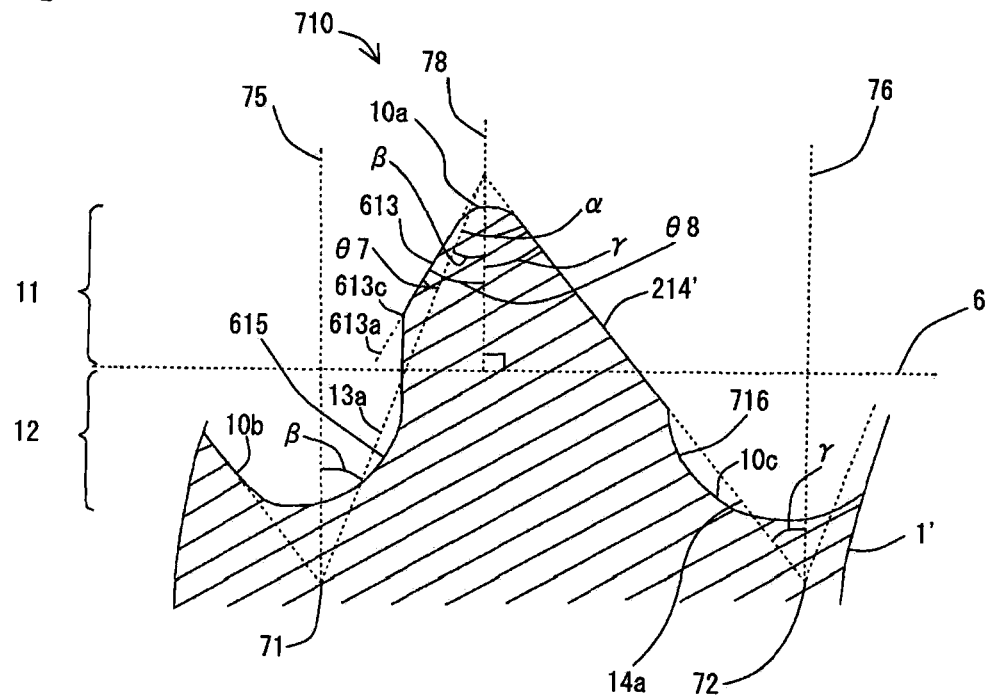
FIG. 11A is a cross-sectional view showing an essential portion of the bolt 1 including a screw thread 710 according to Example 9 of the present invention in an unfastened state.

FIG. 11A is a cross-sectional view showing an essential portion of the bolt 1 including a screw thread 710 according to Example 9 in an unfastened state.

Figure 11B:
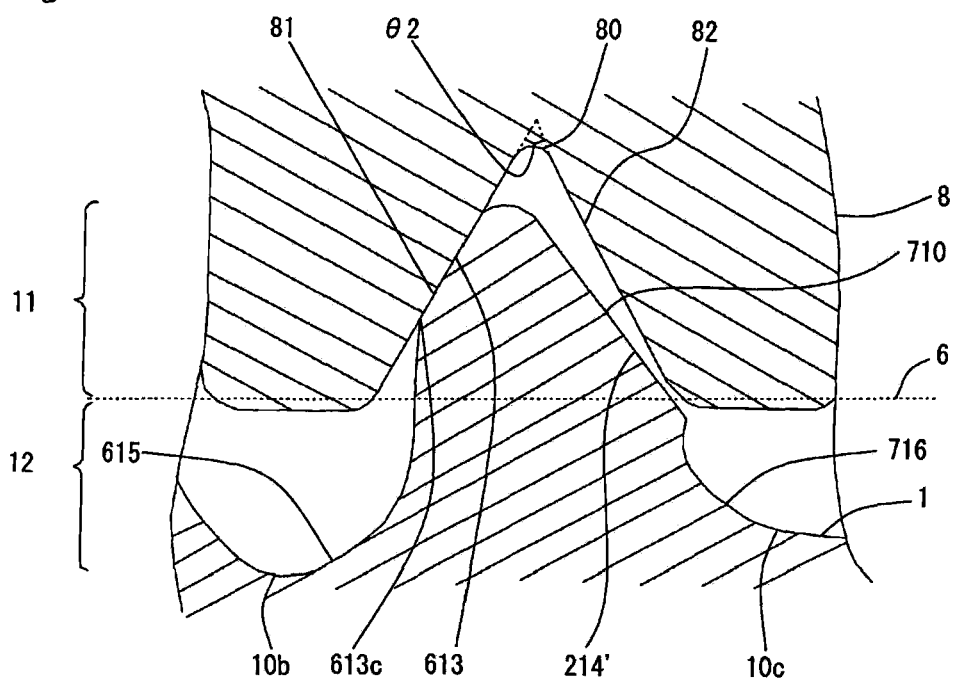
FIG. 11B is a cross-sectional view showing the screw thread 710 in a state in which the bolt 1 according to Example 9 and the nut 8 are fastened to each other.

FIG. 11B is a cross-sectional view showing the screw thread 710 in a state in which the bolt 1 according to Example 9 and the nut 8 are fastened to each other.

The screw thread 710 according to Example 9 is different from the screw thread 610 (see FIGS. 10A and 10B) according to Example 8 only in that a clearance side surface 716 of the lower portion 12 is formed to be curved inward from the imaginary line 14a that is equivalent to the extension line of the clearance flank surface 214'.

Therefore, according to Example 9, the same functions and effects as those of the side surface in other examples in which the clearance side surface of the lower portion 12 is formed to be curved inward from the imaginary line 14a (the side surface 16 (see FIG. 2) according to Example 1, the side surface 16a (see FIG. 4) according to Example 2, the side surface 216 (see FIG. 5A) according to Example 3, the side surface 316 (see FIGS. 7A and 7B) according to Example 5, the side surface 416 (see FIGS. 8A and 8B) according to Example 6, and the side surface 516 (see FIGS. 9A and 9B) according to Example 7) are obtained.

FIG. 12 is a table showing the results of a vibration test in which the period from tightening to loosening was measured for a bolt from items to be tested (items according to the JIS standards, Example 4, and Example 8).

The vibration test was conducted in Kansai Testing Center of Japan Quality Assurance Organization on Jan. 27, 2010.

The items to be tested were M12×60 hexagonal bolts and hexagonal nuts made of carbon steel in strength grades 4.8T and 8.8T and trivalent chromate plated.

In the test, the bolts and nuts were tightened with a tightening torque of 70 N·m.

For normal use, bolts made of carbon steel z 4.8T are tightened with a tightening torque of about 40 to 50 N·m, and bolts made of carbon steel in strength grade 8.8T are tightened with a tightening torque of about 70 to 80 N·m.

The test was conducted as follows. An item to be tested (test specimens) was mounted to a high-speed screw loosening test machine, and tested under predetermined vibration conditions (vibration frequency: 1780 rpm, vibration table stroke: 11 mm, impact stroke: 19 mm, and vibration direction: orthogonal to the bolt axis). When no loosening occurred in ten minutes, a loosening torque was measured.

A vibration barrel and a washer were interposed between the bolt and the nut when mounting the item to be tested to the high-speed screw loosening test machine in order to vibrate the vibration barrel through the vibration table.

Loosening was determined when alignment marks on the bolt, the nut as the items to be tested, and the washer were misaligned and it became possible to manually rotate the washer.

As shown in FIG. 12, the related-art item according to the JIS standards was loosened in as short as 25 seconds for strength grade 8.8T, although it took longer before loosening as the strength grade was higher.

In contrast, the bolt 1 according to Example 4 (see FIG. 6) was not loosened for 2 minutes and 9 seconds for strength grade 4.8T, and not loosened for 9 minutes and 58 seconds for strength grade 8.8T. Thus, it was found that the bolt 1 according to Example 4 yielded a further significant loosening prevention effect compared to the item according to the JIS standards.

The bolt 1 according to Example 8 (see FIGS. 10A and 10B) was not loosened for 4 minutes and 4 seconds for strength grade 4.8T, and not loosened for 10 minutes for strength grade 8.8T. Thus, it was found that the bolt 1 according to Example 8 provided better results than the bolt 1 according to Example 4.

The present invention is not limited in any way by the embodiments (aspects) and the examples described above. Various modifications that may be easily made by those skilled in the art without departing from the scope of the claims fall within the scope of the present invention. The contents of all the papers, patent application publications, and patent publications specified herein are incorporated by reference in their entirety.

While the present invention is applied to a fastening member having a male thread structure in the above examples, the present invention may also be applied to a fastening member having a female thread structure, in which case the same functions and effects as those in the case of application to a fastening member having a male thread structure are obtained.

INDUSTRIAL APPLICABILITY

The fastening member and the fastening structure according to the present invention can be widely utilized as a fastening member and a fastening structure in vehicles, various devices, buildings, and so forth.

DESCRIPTION OF THE REFERENCE NUMERALS 1, 100, 300, 400, 500 BOLT (FASTENING MEMBER)
10, 1a, 200, 210', 310, 410, 510, 610, 710 SCREW THREAD
10a, 211', 311, 411, 511 THREAD CREST
10b, 10c ROOT
11, UPPER PORTION
12, LOWER PORTION
13, 13b, 213, 213b, 313, 413, 513, 613 PRESSURE FLANK SURFACE
14, 14b, 214, 214b, 214', 314, 414b, 514b PLAY FLANK SURFACE
13a, 14a, 75, 76, 511', 613a IMAGINARY LINE
15, 16, 15a, 16a, 215, 216, 216', 315, 316, 415, 416, 515, 516, 615, 716 SIDE SURFACE
414, 514 SWELLING PORTION
511 CUT SURFACE
6 IMAGINARY CYLINDER
7 BASIC PROFILE
73 PRESSURE FLANK SURFACE OF BASIC PROFILE 7
74 CLEARANCE FLANK SURFACE OF BASIC PROFILE 7
8 NUT (MATING FASTENING MEMBER)
80 ROOT OF NUT 8
81 PRESSURE FLANK SURFACE OF NUT 8
82 CLEARANCE FLANK SURFACE OF NUT 8

The invention claimed is:

1. A fastening member having a thread structure including an upper portion provided on a side of a thread crest and a lower portion provided on a side of a thread root, wherein
said fastening member being formed such that said fastening member is configured to fasten to a mating fastening member having a screw thread shape corresponding to a basic profile, wherein a cross-sectional shape of said screw thread shape of said mating fastening member including an axis of said mating fastening member is symmetrical across a straight line, which is perpendicular to said axis and which runs through a thread root of said mating fastening member, and wherein said mating fastening member has an included angle of 55 degrees or 60 degrees, said thread crest and a pressure flank surface formed in said upper portion are closer to a seat surface than a pressure flank surface of a basic profile of said fastening member corresponding to said basic profile of said mating fastening member within a range where a flank angle of the pressure flank surface of the fastening member is equal to or larger than approximately 18°, at least one side surface of said lower portion is provided inwardly of an extension line of a corresponding flank surface of said upper portion and formed to be continuous from a lower end of said corresponding flank surface, said corresponding flank surface being flat when viewed in cross section including an axis of said fastening member, and said thread crest and said pressure flank surface of said fastening member are formed such that, when said fastening member is tightened into said mating fastening member, an upper end of said pressure flank surface of said fastening member first contacts a pressure flank surface of said mating fastening member, and then, the other portion of said pressure flank surface of said fastening member contacts said pressure flank surface of said mating fastening member due to elastic deformation of said lower portion of said fastening member.

2. A fastening member according to claim 1, wherein when viewed in cross section including an axis of said fastening member, said at least one side surface of said lower portion has a shape of a curved surface, which is curved inward from said extension line of said corresponding flank surface, and has no flat portion.

3. A fastening member according to claim 2, wherein a lower end of said pressure flank surface of said upper portion is positioned near an effective diameter of said thread structure.

4. A fastening member according to claim 1, wherein when viewed in cross section including an axis of said fastening member, said at least one side surface of said lower portion has a shape in which a flat surface that is disposed inwardly of said extension line of said corresponding flank surface and a curved surface that is curved inward from said extension line are combined, and said flat surface is a surface that is perpendicular to an axial direction of said fastening member.

5. A fastening member according to claim 1, wherein a lower end of a clearance flank surface is positioned on said side of said thread crest with respect to an imaginary cylinder indicating an effective diameter of said basic profile, and
a clearance side surface of said lower portion is provided inwardly of an extension line of said clearance flank surface, and formed to be continuous from said lower end of said clearance flank surface.

6. A fastening member according to claim 1, wherein a lower end of said pressure flank surface is positioned on said side of said thread crest with respect to a lower end of a clearance flank surface,
a pressure side surface of said lower portion is provided inwardly of an extension line of said pressure flank surface, and formed to be continuous from said lower end of said pressure flank surface, and
a clearance side surface of said lower portion is provided inwardly of an extension line of said clearance flank surface, and formed to be continuous from said lower end of said clearance flank surface.

7. A fastening member according to claim 6, wherein said lower end of said pressure flank surface is positioned on said side of said thread crest with respect to an imaginary cylinder indicating an effective diameter of said basic profile, and
said lower end of said clearance flank surface is positioned on said side of said thread root with respect to said imaginary cylinder.

8. A fastening member according to claim 1, wherein an angle of a screw thread of said upper portion is generally the same as an angle of a screw thread of said basic profile.

9. A fastening member according to claim 1, wherein an angle of a screw angle of said upper portion is larger than an angle of a screw thread of said basic profile, and
a flank angle of said pressure flank surface is generally the same as a flank angle of said basic profile.

10. A fastening member according to claim 9, wherein a lower end of said pressure flank surface is positioned on said side of said thread crest with respect to a lower end of a clearance flank surface,
a pressure side surface of said lower portion is provided inwardly of an extension line of said pressure flank surface, and formed to be continuous from said lower end of said pressure flank surface, and
a clearance side surface of said lower portion is provided inwardly of an extension line of said clearance flank surface, and formed to be continuous from said lower end of said clearance flank surface.

11. A fastening member according to claim 10, wherein said lower end of said pressure flank surface is positioned on said side of said thread crest with respect to an imaginary cylinder indicating an effective diameter of said basic profile, and
said lower end of said clearance flank surface is positioned on said side of said thread root with respect to said imaginary cylinder.

12. A fastening structure comprising:
a fastening member according to claim 1, and
a mating fastening member to be fastened to said fastening member, wherein
when said fastening member is fastened to said mating fastening member, a pressure flank surface of said mating fastening member presses said pressure flank surface of said fastening member to warp an entire screw thread in order to increase a friction force between said pressure flank surface of said fastening member and said pressure flank surface of said mating fastening member.

13. A fastening structure according to claim 12, wherein when said fastening member is fastened to said mating fastening member, said thread crest of said fastening member contacts a thread root of said mating fastening member.

14. A fastening structure according to claim 12, wherein when said fastening member is fastened to said mating fastening member, said clearance flank surface of said fastening member contacts a clearance flank surface of said mating fastening member.

15. A fastening structure according to claim 12, wherein a cut surface is formed by cutting away a portion of said fastening member in the vicinity of said thread crest along a line extending obliquely downward toward said pressure flank surface.

16. A fastening member according to claim 1, wherein when viewed in cross section including an axis of said fastening member, said at least one side surface of said lower portion has a shape in which a flat surface that is disposed inwardly of said extension line of said corresponding flank surface and a curved surface that is curved inward from said extension line are combined.

17. A fastening member according to claim 16, wherein a lower end of said pressure flank surface of said upper portion is positioned near an effective diameter of said thread structure.

18. A fastening member according to claim 1, wherein said basic profile of said fastening member is a screw thread shape that has a screw thread angle of 60 degrees or 55 degrees.

19. A fastening member according to claim 1, wherein said thread root is shifted toward the seat surface as compared to a thread root of the basic profile of the fastening member.

20. A fastening member according to claim 1, wherein a cross-sectional shape of an upper end portion of the thread around the thread crest has no straight portion.

21. A fastening member having a thread structure including an upper portion provided on a side of a thread crest and a lower portion provided on a side of a thread root, wherein
said fastening member being formed such that said fastening member is configured to fasten to a mating fastening member having a screw thread shape corresponding to a basic profile, wherein the basic profile of the mating fastening member defines a pitch of the thread, and the basic profile of the fastening member defines the same pitch as the pitch of the basic profile of the mating fastening member, wherein a cross-sectional shape of said screw thread shape of said mating fastening member including an axis of said mating fastening member is symmetrical across a straight line, which is perpendicular to said axis and which runs through a thread root of said mating fastening member, and wherein said mating fastening member has an included angle of 55 degrees or 60 degrees, a crest, a pressure flank surface and a clearance flank surface of said thread structure are shifted, respectively, to a side of a seat surface compared to a crest, a pressure flank surface and a clearance flank surface of a basic profile of said fastening member corresponding to said basic profile of said mating fastening member, using a pair of roots of said basic profile of said fastening member as base points, at least a pressure side surface of said lower portion has a portion that is provided inwardly of an extension line of said pressure flank surface of said upper portion and that is formed to be continuous from a lower end of said pressure flank surface, said pressure flank surface being flat when viewed in cross section including an axis of said fastening member and said thread crest and said pressure flank surface of said fastening member are formed such that, when said fastening member is tightened into said mating fastening member, an upper end of said pressure flank surface of said fastening member first contacts a pressure flank surface of said mating fastening member, and then, the other portion of said pressure flank surface of said fastening member contacts said pressure flank surface of said mating fastening member due to elastic deformation of said lower portion of said fastening member.

22. A fastening member according to claim 21, wherein an angle of a screw thread of said upper portion is generally the same as an angle of a screw thread of said basic profile of said fastening member.

23. A fastening member according to claim 21, wherein said thread root is shifted toward the seat surface as compared to a thread root of the basic profile of the fastening member.

24. A fastening member according to claim 21, wherein a cross-sectional shape of an upper end portion of the thread around the thread crest has no straight portion.

* * * * *